(12) United States Patent
Shin et al.

(10) Patent No.: US 12,019,723 B2
(45) Date of Patent: Jun. 25, 2024

(54) METHOD FOR AUTHENTICATING USER AND ELECTRONIC DEVICE ASSISTING SAME

(71) Applicant: Samsung Electronics Co., Ltd., Suwon-si (KR)

(72) Inventors: Minsoo Shin, Suwon-si (KR); Jiyoung Park, Suwon-si (KR); Heejun You, Suwon-si (KR); Moonsoo Chang, Suwon-si (KR); Yongha Choi, Suwon-si (KR); Wonjung Choi, Suwon-si (KR); Jihee Hong, Suwon-si (KR); Donghyun Yeom, Suwon-si (KR); Dasom Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 204 days.

(21) Appl. No.: 17/516,309

(22) Filed: Nov. 1, 2021

(65) Prior Publication Data

US 2022/0058251 A1 Feb. 24, 2022

Related U.S. Application Data

(63) Continuation of application No. PCT/KR2020/003352, filed on Mar. 11, 2020.

(30) Foreign Application Priority Data

Apr. 30, 2019 (KR) .................. 10-2019-0051043

(51) Int. Cl.
*G06F 21/32* (2013.01)
*G06F 21/45* (2013.01)

(52) U.S. Cl.
CPC .............. *G06F 21/32* (2013.01); *G06F 21/45* (2013.01)

(58) Field of Classification Search
CPC .............. G06F 21/30–36; G06F 21/45; H04W 12/06–069; H04L 63/08–0861; H04L 9/32–3297
See application file for complete search history.

(56) References Cited

U.S. PATENT DOCUMENTS

| 10,769,258 B2 | 9/2020 | Shin et al. |
| 2006/0203853 A1 | 9/2006 | Hwang |

(Continued)

FOREIGN PATENT DOCUMENTS

| CN | 107895110 A | * | 4/2018 | |
| ES | 2374221 T3 | * | 2/2012 | ............. B60R 25/25 |

(Continued)

OTHER PUBLICATIONS

Extended Search Report and Written Opinion dated May 13, 2022 in counterpart International Patent Application No. 20798793.4.

(Continued)

*Primary Examiner* — Madhuri R Herzog
(74) *Attorney, Agent, or Firm* — Nixon & Vanderhye P.C.

(57) ABSTRACT

An electronic device according to various embodiments of the present disclosure includes: at least one sensor; a communication circuit; at least one processor operably coupled with the at least one sensor and the communication circuit; and at least one memory operably coupled with the at least one processor, wherein the memory may store instructions which, when executed, cause the processor to: receive a request for authenticating a user of the electronic device using a designated authentication method; identify whether a device selected as a reference device is a first device among the first device and a second device which are included in the at least one sensor and the communication circuit, and are capable of generating authentication data required for using the designated authentication method to authenticate the user; generate data, when first authentica- (Continued)

tion data for authenticating the user is acquired from the first device, indicating a first time point at which the processor acquired the first authentication data; generate data, when second authentication data for authenticating the user is acquired from the second device, indicating a second time point at which the processor acquired the second authentication data; confirm, based on the first data indicating the first time point and the second data indicating the second time point, whether the second time point is within a threshold time range based on the first time point; and authenticate the user using the first authentication data and the second authentication data based on whether the second time point is within the threshold time range based on the first time point.

15 Claims, 8 Drawing Sheets

(56) References Cited

U.S. PATENT DOCUMENTS

| | | |
|---|---|---|
| 2012/0019379 A1 | 1/2012 | Ben Ayed |
| 2012/0246483 A1* | 9/2012 | Raisch .................. H04L 9/3297 713/178 |
| 2013/0227651 A1 | 8/2013 | Schultz et al. |
| 2014/0289833 A1 | 9/2014 | Briceno et al. |
| 2015/0033305 A1 | 1/2015 | Shear et al. |
| 2016/0294557 A1* | 10/2016 | Baldwin ............... G06V 10/993 |
| 2017/0344407 A1* | 11/2017 | Jeon ........................ G06F 21/74 |
| 2017/0372051 A1 | 12/2017 | Lee et al. |
| 2018/0107885 A1* | 4/2018 | Jo ...................... G06V 40/1365 |
| 2018/0260550 A1 | 9/2018 | Shin et al. |
| 2019/0102532 A1 | 4/2019 | Corcoran |

FOREIGN PATENT DOCUMENTS

| | | | |
|---|---|---|---|
| JP | 5823651 B1 * | 11/2015 | ............. G06F 21/31 |
| KR | 10-2006-0007544 | 1/2006 | |
| KR | 10-2006-0099687 | 9/2006 | |
| KR | 10-2009-0022425 | 3/2009 | |
| KR | 10-2017-0073200 | 6/2017 | |
| KR | 10-2017-0073200 A | 6/2017 | |
| KR | 20170073200 A * | 6/2017 | |
| KR | 10-1813950 | 12/2017 | |
| KR | 10-1821115 | 1/2018 | |
| KR | 10-2018-0103376 | 9/2018 | |
| KR | 10-2018-0103376 A | 9/2018 | |

OTHER PUBLICATIONS

International Search Report for PCT/KR2020/003352 dated Jun. 29, 2020, 5 pages.
Written Opinion of the ISA for PCT/KR2020/003352 dated Jun. 29, 2020, 5 pages.
Korean Office Action dated Apr. 29, 2024 for KR Application No. 10-2019-0051043.

* cited by examiner

METHOD FOR AUTHENTICATING USER AND ELECTRONIC DEVICE ASSISTING SAME

CROSS-REFERENCE TO RELATED APPLICATIONS

This application is a continuation of International Application No. PCT/KR2020/003352 designating the United States, filed on Mar. 11, 2020, in the Korean Intellectual Property Receiving Office and claiming priority to Korean Patent Application No. 10-2019-0051043, filed on Apr. 30, 2019 in the Korean Intellectual Property Office, the disclosures of which are incorporated by reference herein in their entireties.

TECHNICAL FIELD

The disclosure relates to a method for authenticating a user and an electronic device assisting the same.

BACKGROUND ART

An electronic device performs various functions as well as a voice call function. Among the various functions executable by the electronic device, some functions (e.g., a locking function and payment function of the electronic device) need user authentication, and are executed only when the user authentication succeeds and can be restricted in execution when the user authentication fails.

In recent years, the electronic device uses biometric data (e.g., fingerprint data, iris data, and face data) of a user for the sake of the user authentication. Also, the electronic device performs the user authentication using biometric data acquired from a sensor, in order to strengthen the user authentication.

DISCLOSURE OF INVENTION

Technical Problem

When an electronic device authenticates a user using one or more biometric data acquired from a sensor, the electronic device performs user authentication using the acquired one or more biometric data according to a specified sequence and does not consider a difference between time points of acquiring the one or more biometric data. For example, when the electronic device authenticates the user using a first sensor and a second sensor, the electronic device can acquire 1-1 biometric data from the first sensor at a first time point, and acquire second biometric data from the second sensor at a second time point after the first time point, and acquire 1-2 biometric data from the first sensor at a third time point after the second time point. In this case, even when a difference between the second time point of acquiring the second biometric data and the third time point of acquiring the 1-2 biometric data is less than a difference between the first time point of acquiring 1-1 biometric data and the second time point of acquiring the second biometric data, the electronic device authenticates the user using the 1-1 biometric data and the second biometric data according to a specified sequence (e.g., a sequence of firstly acquiring on time). When the electronic device performs the user authentication using the acquired one or more biometric data according to the specified sequence without considering the difference between the time points of acquiring the one or more biometric data, a reliability of the user authentication can be deteriorated, and it can be vulnerable to a falsification attack (e.g., a spoofing attack).

Embodiments of the disclosure relate to a method for authenticating a user and an electronic device assisting the same, in which an electronic device can perform user authentication in consideration of (e.g., based on) a difference between time points of acquiring one or more authentication data from a sensor.

The disclosure is not limited to the above-mentioned features, and other features not mentioned above would be able to be clearly understood by a person having ordinary skill in the art from the disclosure.

Solution to Problem

An electronic device according to an example embodiment of the present disclosure can include: at least one sensor, a communication circuit, at least one processor operably coupled with the at least one sensor and the communication circuit, and at least one memory operably coupled with the at least one processor. The memory can store instructions which, in response to being executed, cause the processor to: receive a request for authenticating a user of the electronic device using a specified authentication method, identify whether a device selected as a reference device is a first device among the first device and a second device included in the at least one sensor and the communication circuit, the first device and the second device being capable of providing authentication data required for authenticating the user using the specified authentication method, based on first authentication data for authenticating the user acquired from the first device, generate data indicating a first time point at which the processor acquires the first authentication data, based on second authentication data for authenticating the user acquired from the second device, generate data indicating a second time point at which the processor acquires the second authentication data, identify whether the second time point is within a threshold time range from the first time point, based on the data indicating the first time point and the data indicating the second time point; and authenticate the user by using the first authentication data and the second authentication data, based on the second time point being within the threshold time range from the first time point.

A method according to an example embodiment of the present disclosure can include: receiving a request for authenticating a user of an electronic device using a specified authentication method, identifying whether a device selected as a reference device is a first device among the first device and a second device included in at least one sensor and a communication circuit, the first device and the second device being capable of providing authentication data required for authenticating the user using the specified authentication method, based on first authentication data for authenticating the user acquired from the first device, generating data indicating a first time point at which the processor acquires the first authentication data, based on second authentication data for authenticating the user acquired from the second device, generating data indicating a second time point at which the processor acquires the second authentication data, identifying whether the second time point is within a threshold time range of the first time point, based on the data indicating the first time point and the data indicating the second time point; and authenticating the user using the first authentication data and the second authentication data, based on whether the second time point is within the threshold time range of the first time point.

Advantageous Effects of Invention

Various example embodiments of the present disclosure can strengthen security in authenticating a user, by performing user authentication by an electronic device in consideration of (e.g., based on) a difference between times points of acquiring one or more authentication data from a sensor.

BEST MODE FOR CARRYING OUT THE INVENTION

Figure 1:
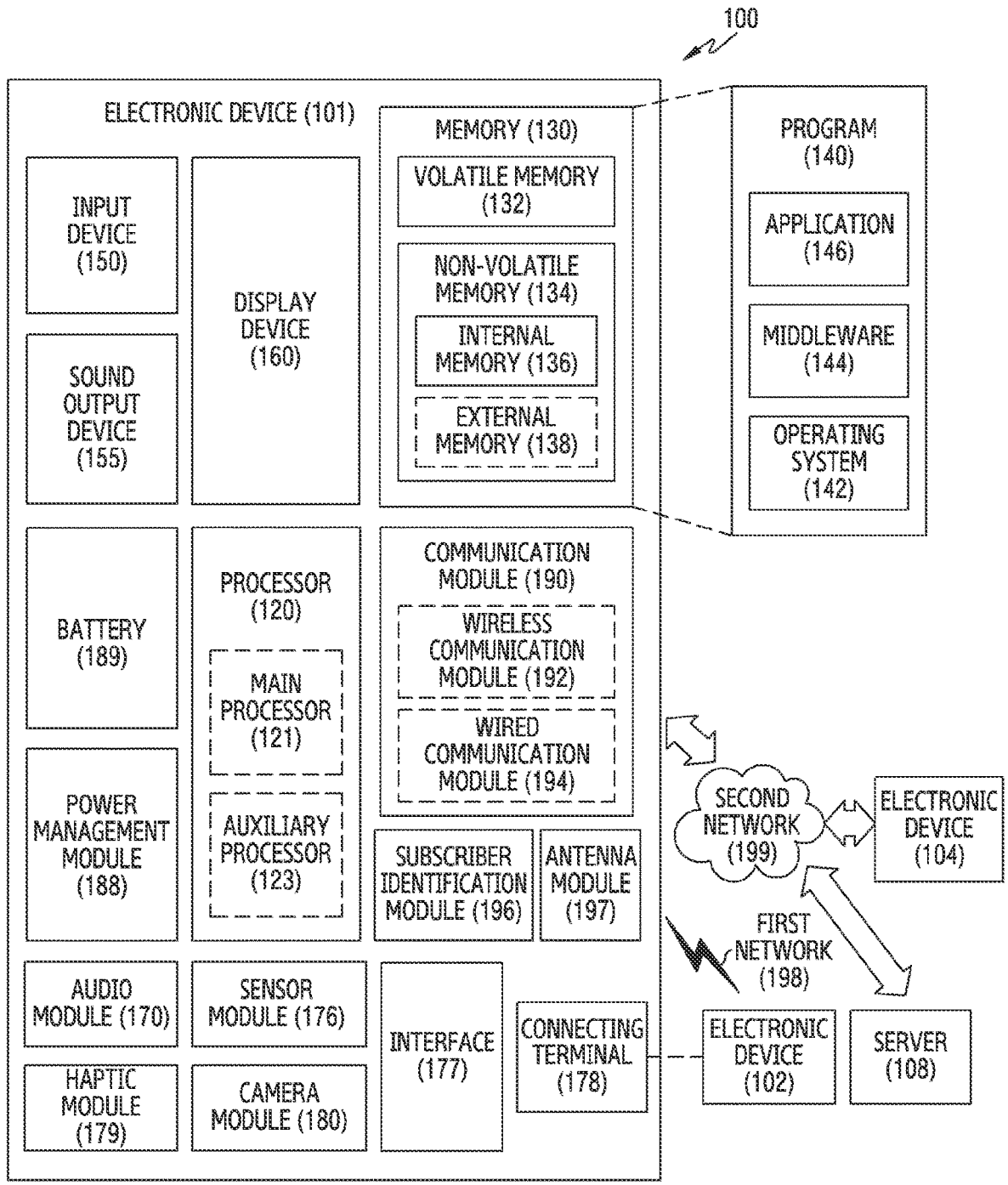
FIG. 1 is a block diagram illustrating an example electronic device within a network environment, according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In various embodiments, at least one (e.g., the display device 160 or the camera module 180) of the components may be omitted from the electronic device 101, or one or more other components may be added in the electronic device 101. In various embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator. The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
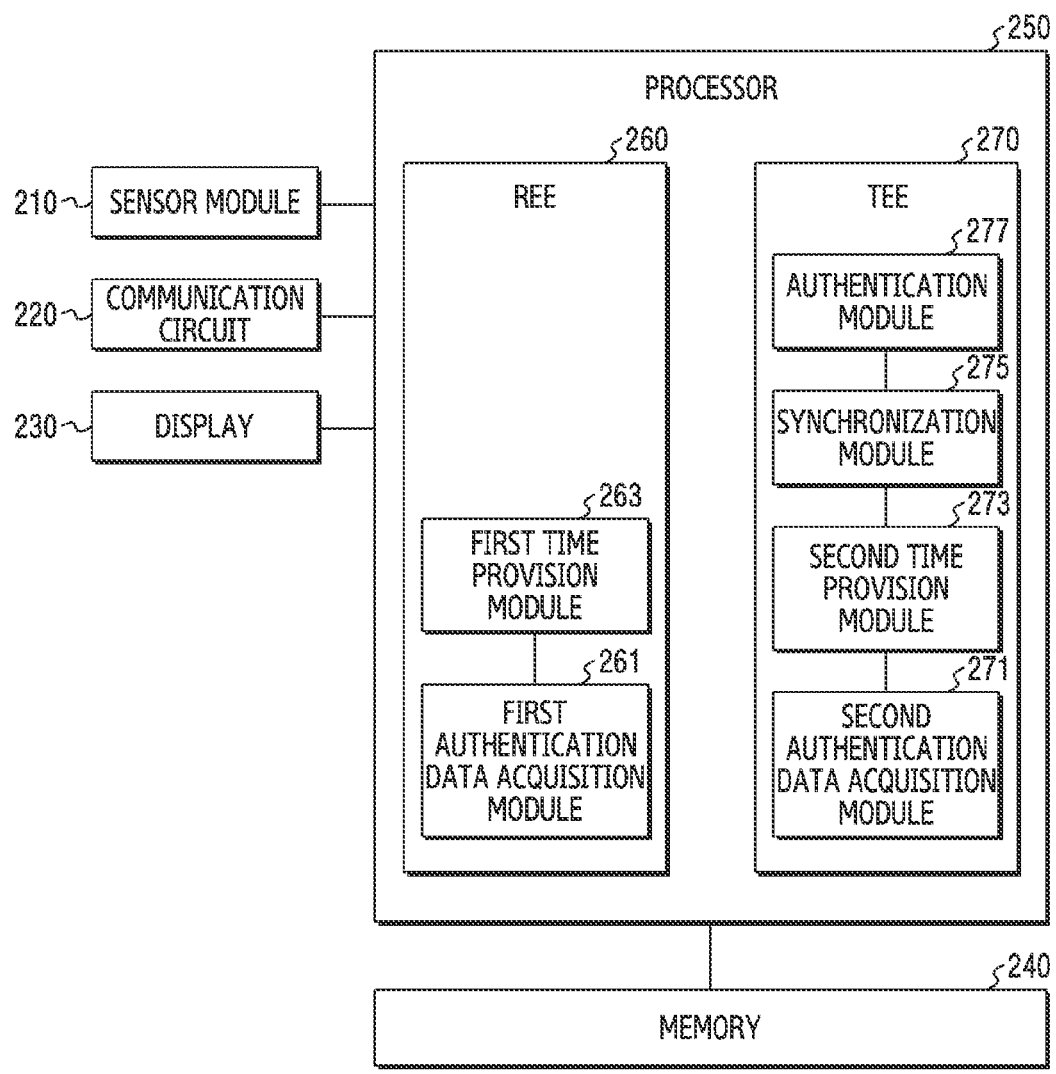
FIG. 2 is a block diagram illustrating an example configuration of an electronic device according to various embodiments.

FIG. 2 is a block diagram illustrating an example configuration of the electronic device 101 according to various embodiments.

Referring to FIG. 2, the electronic device 101 can include a sensor module (e.g., including at least one sensor) 210, a communication circuit 220, a display 230, a memory 240, and a processor (e.g., including processing circuitry) 250.

In an embodiment, the sensor module 210 can include various sensors capable of providing authentication data (below, referred to as 'authentication data') for authenticating (or required for performing an authentication operation) a user of the electronic device 101 (below, referred to as a 'user').

In an embodiment, the sensor module 210 can include a plurality of sensors (or biometric sensors) for providing biometric data as authentication data. For example, the sensor module 210 can include an image sensor (e.g., a red-green-blue (RGB) sensor or an infrared (IR) sensor) for providing data (or an image) on a user's face, an iris sensor (e.g., an infrared (IR) sensor) for providing data on a user's iris, a depth sensor (e.g., a time of flight (TOF) sensor or a structured light (SL) sensor) for providing depth (or distance) data on a subject, or a fingerprint sensor for providing data on a user's fingerprint. In an embodiment, one sensor (e.g., an IR sensor) can provide a mutually different plurality of data (e.g., iris data and depth data). For example, in response to authenticating the user's iris, one IR sensor can provide the iris data, and provide the depth data required for an operation of determining whether an authentication target is a real user or a user image. However, the sensor capable of providing the biometric data as the authentication data is not limited to the aforementioned example.

In an embodiment, the sensor module 210 can include a motion sensor (or an inertial sensor) for providing motion (or movement or gesture) data (e.g., motion pattern data) as authentication data. In an embodiment, the motion sensor can include a gyro sensor, an acceleration sensor, or a geomagnetic sensor.

In an embodiment, the motion sensor can provide motion data which is used for user authentication.

In an embodiment, the sensor module 210 for providing authentication data is not limited to the sensor capable of providing the biometric data described above and the motion sensor for providing the motion data, and the sensor capable of providing the authentication data can include all of various sensors.

In an embodiment, the sensor module 210 can at least partially be the same as or similar with the sensor module 176 and/or camera module 180 of FIG. 1.

In an embodiment, the communication circuit 220 can provide authentication data. For example, a WiFi communication module can provide feature data on a subject (e.g., depth data on the subject or permittivity data on the subject) based on a signal (or light) received from the external (or reflected from the subject). However, the authentication data provided by the communication circuit 220 is not limited to the aforementioned example.

In an embodiment, the display 230 can display information indicating that user authentication using authentication data succeeds or fails. However, the information displayed by the display 230 is not limited to the aforementioned example.

In an embodiment, the display 230 is at least partially the same as or similar with the display device 160 of FIG. 1.

In an embodiment, the memory 240 can store various data for authenticating a user.

In an embodiment, the memory 240 can include a sharing memory (not shown) (or a sharing memory region) which is all accessible in the rich execution environment (REE) 260 and the trusted execution environment (TEE) 270 of the processor 250. For example, the sharing memory can be a memory in which the processor 250 operating in the REE (or when the processor 250 operates in the REE) and the processor 250 operating in the TEE (or when the processor 250 operates in the TEE) stores sharable data.

In an embodiment, the memory 240 can further include a secure memory (not shown) (or a secure memory region) which is accessible only in the TEE. For example, the secure memory can be a memory which the processor 240 operating in the REE cannot access but the processor 250 operating in the TEE can access.

In an embodiment, the memory 240 can include a secure memory region (not shown) that only a specified granted processor can access. For example, the secure region can be specified by a physical or logical address. Or, though not illustrated, the electronic device 101 can include a plurality of memories. Among the plurality of memories, at least one memory can be used as a secure memory (or a sharing memory).

In an embodiment, the memory 240 can store authentication data. For example, the authentication data can be stored in the secure region. However, data that the memory 240 stores are not limited to the authentication data, and a region in which the authentication data is stored is not limited to the secure region. Various embodiments of the data stored in the memory 240 will be described later.

In an embodiment, the memory 240 can be at least partially the same as or similar with the memory 130 of FIG. 1.

In an embodiment, the processor 250 may include various processing circuitry and can generally control an operation for authenticating a user using at least one sensor included in the sensor module 210 and the communication circuit 220 (e.g., a communication circuit possible to provide authentication data).

In an embodiment, the processor 250 can set one device among a plurality of devices as a reference device (below, referred to as a 'reference device'), for the sake of comparison between time points of acquiring authentication data from at least one sensor and the plurality of devices (or modules) included in the communication circuit 220.

In an embodiment, the processor 250 can set a device capable of providing authentication data among the plurality of devices, as the reference device, based on a degree of falsification difficulty (or a degree of being difficult to falsify or a security degree). For example, the processor 250 can set a device capable of providing authentication data whose falsification difficulty degree is highest (or which is most difficult to be falsified, or whose security is highest) as the reference device. For example, the processor 250 can set an iris sensor providing iris data which, compared to face data, includes an inherent feature and is difficult to be falsified (or whose security is high), among an image sensor providing face data and the iris sensor providing the iris data, as the reference device.

In an embodiment, the processor 250 can set a sensor whose cycle (or a frame per second (FPS)) providing authentication data is shortest, among the plurality of devices, as the reference device.

In an embodiment, the processor 250 can set (or change) the reference device among the plurality of devices, based on situation information. For example, in response to the electronic device 101 being in a bright environment (e.g., an environment in which a sensor receives light of a specified amount or more), the processor 250 can set a device capable of providing authentication data whose security is highest among the plurality of devices, as the reference device. In response to the electronic device 101 moving from the bright environment to a dark environment (e.g., an environment in which the sensor receives light less than a specified amount), the processor 250 can set (or change) a device whose cycle of providing authentication data is shortest among the plurality of devices, as the reference device.

However, the method in which the processor 250 sets the reference device among the plurality of devices is not limited to the aforementioned example.

In an embodiment, the processor 250 can set a time point of acquiring authentication data from the reference device, as a time point (below, referred to as a 'reference time point') becoming a reference for comparison with a time point (below, referred to as a 'comparison time point') of acquiring authentication data from at least one sensor (below, referred to as a 'comparison device') other than the reference device. However, an embodiment is not limited to this.

In an embodiment, the processor 250 can determine the remnant sensor excepting the reference device, as the comparison device. For example, the comparison device can include a sensor (e.g., a temperature/humidity sensor and an illumination sensor) not providing authentication data as well. However, an embodiment is not limited to this.

In an embodiment, the processor 250 can set the plurality of devices as a main device or auxiliary device, based on an attribute of authentication data. In an embodiment, the processor 250 can set a device (or sensor) providing authentication data including unique information of a user distinct from another user such as face data or iris data, as the main device (or a main sensor). In an embodiment, the processor 250 can set a device (or sensor) providing data which does not include the unique information of the user but is required for authenticating the user such as depth data, as the auxiliary device (or an auxiliary sensor). For example, the processor 250 can determine a device providing depth data which is required for an operation (e.g., a liveness obtaining operation) for determining an image of the user as to whether an authentication target is a real user, as the auxiliary device. However, the method in which the processor 250 sets the plurality of devices as the main device or auxiliary device based on the attribute of the authentication data is not limited to the aforementioned example.

In an embodiment, an operation in which the processor 250 sets the reference device and the comparison device can be independent from an operation in which the processor 250 sets the main device and the auxiliary device. For example, the processor 250 can set the device having been set as the reference device, as the main device or auxiliary device, or set the device having been set as the comparison device, as the main device or auxiliary device. However, below, a description will be made assuming that the reference device is the main device.

In an embodiment, the processor 250 can receive a request for authenticating a user in a specified authentication method. In an embodiment, the processor 250 can receive an input for executing a function (e.g., a locking function (or an unlocking function) and a payment function) (or application) related to authentication execution. In an embodiment, the processor 250 can confirm an authentication method specified (or selected) for the function related to the authentication execution. For example, the processor 250 can confirm that an authentication method specified for unlocking is an authentication method (or a complicated authentication method) which uses face data and depth data. For another example, the processor 250 can confirm that an authentication method specified for payment is an authentication method which uses face data and iris data.

In an embodiment, the processor 250 can confirm a plurality of devices capable of providing authentication data which is required for performing authentication in the confirmed authentication method, among devices included in the sensor module 210 and communication circuit 220. In an embodiment, the processor 250 can acquire at least one biometric data from the plurality of devices (or at least one of the plurality of devices can be a biometric sensor).

In an embodiment, the processor 250 can confirm a device set as the reference device, among the plurality of devices capable of providing data required for performing authentication in the confirmed authentication method.

In an embodiment, the processor 250 can offer the REE 260 and the TEE 270. For example, the REE 260 and the TEE 270 can be offered through a divided virtual (or logical) core. In an embodiment, the processor 250 can divide one core into a plurality of virtual cores. For example, the processor 250 can divide into a virtual general core performing a work (or a process or a thread) in the REE 260 and a virtual security core performing a work in the TEE 270.

In an embodiment, the REE 260 can be a first execution environment having a first secure level. The TEE 270, for example, can be a second execution environment having a second secure level which is different from (e.g., is higher than) the first secure level. In an embodiment, the electronic device 101 can include additional another execution environment (e.g., a third execution environment) having a third secure level, and an embodiment is not limited to this.

In an embodiment, the REE 260 and TEE 270 of the processor 250 can be an execution environment which is driven by a switching operation. For example, the processor 250 operating in the REE 260 can operate in the TEE 270 (e.g., activate the TEE 270 in order to process a message related process) by transmitting a message (or a notification) to a TEE communication agent (not shown) through an REE communication agent (not shown).

In an embodiment, the REE 260 and TEE 270 of the processor 250 can be an execution environment which is divided in a hardware manner. For example, the REE 260 and the TEE 270 can be separated components capable of processing processes in parallel.

In an embodiment, the electronic device 101 can manage the TEE 270 through a physical change of hardware or a logical change of software. The TEE 270 can be mutually separated from the REE 260 through hardware restriction, and can be separated and operated in a software manner in the same hardware. For example, in response to the REE 260 and the TEE 270 being separated and operated, the REE 260 and the TEE 270 can independently operate.

In an embodiment, though not illustrated, the electronic device 101 can include a plurality of processors (e.g., the main processor 121 of FIG. 1 and the auxiliary processor 123 of FIG. 1). For example, the electronic device 101 can include each of a processor managed in the REE 260 and a processor managed in the TEE 270. In this case, the REE 260 and the TEE 270 can be separated and operated through hardware restriction which uses the processor. However, this corresponds to an embodiment, and in various embodiments of the present disclosure, it will be understood by a person having an ordinary skill in the art that a hardware environment for separating the REE 260 and the TEE 270 is not limited to this.

In an embodiment, the processor 250 can include a first authentication data acquisition module 261 and a first time provision module 263 in the REE 260, each of the modules may include various processing circuitry and/or executable program instructions.

In an embodiment, the first authentication data acquisition module 261 and the first time provision module 263 can be implemented as hardware or software. In response to the first authentication data acquisition module 261 and the first time provision module 263 being implemented as software, it can be understood that the first authentication data acquisition module 261 and the first time provision module 263 are executed by the processor 250.

In an embodiment, the first authentication data acquisition module 261 can acquire authentication data from the sensor module 210 (or the communication circuit 220). For example, the first authentication data acquisition module 261 can acquire (or confirm) depth data on a subject which is provided by a TOF sensor and stored in the memory 240 (e.g., an REE (or normal) region within the memory 240).

In an embodiment, in response to the first authentication data acquisition module 261 acquiring authentication data from the sensor module 210 (or the communication circuit 220), the first time provision module 263 can provide data indicating a time point at which the first authentication data acquisition module 261 has acquired the authentication data. For example, the first time provision module 263 can provide the data indicating the time point at which the first authentication data acquisition module 261 has acquired the authentication data, in a time stamp, index, or count form (or method). However, the form in which the first time provision module 263 provides the data indicating the time point of acquiring the authentication data is not limited to the aforementioned example.

In an embodiment, the first time provision module 263 can forward data indicating a time point of acquiring authentication data, together with the authentication data, to a synchronization module 275. In an embodiment, the first time provision module 263 can forward the authentication data and the data indicating the time point of acquiring the authentication data, to the synchronization module 275. For example, the first time provision module 263 can store the authentication data and the data indicating the time point of acquiring the authentication data, in the memory 240 (or a sharing memory) (or a buffer) to which the processor 250 operating in the REE 260 and the processor 250 operating in the TEE 270 can all access. In an embodiment, in response to the first time provision module 263 storing the authentication data or the data indicating the time point of acquiring the authentication data in the sharing memory, the processor 250 can operate in an execution environment switched from the REE 260 to the TEE 270 (e.g., switched from the REE 260 to the TEE 270). In an embodiment, in response to the first time provision module 263 storing the authentication data or the data indicating the time point of acquiring the authentication data in the sharing memory, the processor 250 operating in the REE 260 can forward a message (or a notification) indicating that the authentication data or the data indicating the time point of acquiring the authentication data are stored in the sharing memory, to the processor 250 operating in the TEE 270. In an embodiment, the synchronization module 275 can receive (or receive a delivery of) the authentication data or the data indicating the time point of acquiring the authentication data, by confirming the authentication data or the data indicating the time point of acquiring the authentication data, which is stored in the sharing memory.

In an embodiment, the processor 250 can include a second authentication data acquisition module 271, a second time provision module 273, the synchronization module 275, and an authentication module 277 in the TEE 270, each of the modules may include various processing circuitry and/or executable program instructions.

In an embodiment, the second authentication data acquisition module 271, the second time provision module 273, the synchronization module 275, and the authentication module 277 can be implemented as hardware or software. In response to the second authentication data acquisition module 271, the second time provision module 273, the synchronization module 275, and the authentication module 277 being implemented as software, it can be understood that the second authentication data acquisition module 271, the second time provision module 273, the synchronization module 275, and the authentication module 277 are executed by the processor 250.

In an embodiment, the second authentication data acquisition module 271 can acquire authentication data from the sensor module 210 (or the communication circuit 220). For example, the second authentication data acquisition module 271 can acquire (or confirm) iris data on a subject which is provided by an iris sensor and stored in the memory 240 (e.g., a TEE (or secure region) within the memory 240).

In an embodiment, in response to the second authentication data acquisition module 271 acquiring authentication data from the sensor module 210 (or the communication circuit 220), the second time provision module 273 can provide data indicating a time point at which the second authentication data acquisition module 271 has acquired the authentication data. For example, the second time provision module 273 can provide the data indicating the time point at which the second authentication data acquisition module 271 has acquired the authentication data, in a time stamp, index, or count form (or method).

In an embodiment, the second time provision module 273 can forward the data indicating the time point of acquiring the authentication data, together with the authentication data, to the synchronization module 275. In an embodiment, the second time provision module 273 can forward the authentication data and the data indicating the time point of acquiring the authentication data, to the synchronization module 275. For example, the second time provision module 273 can store the authentication data and the data indicating the time point of acquiring the authentication data, in the memory 240 (or a secure memory) (or buffer) which only the processor 250 operating in the TEE 270 can access.

In an embodiment, the synchronization module 275 can receive the data indicating the time point of acquiring the authentication data, from at least one of the first time provision module 263 or the second time provision module 273. For example, in response to the first time provision module 263 storing the authentication data and the data indicating the time point of acquiring the authentication data in the sharing memory, the synchronization module 275 can confirm the data indicating the time point of acquiring the authentication data stored in the sharing memory. For another example, in response to the second time provision module 273 storing the authentication data and the data indicating the time point of acquiring the authentication data in the secure memory (or a secure region of the memory 240), the synchronization module 275 can confirm the data indicating the time point of acquiring the authentication data stored in the secure memory.

In an embodiment, the synchronization module 275 can set a reference time point, based on the data indicating the time point of acquiring the authentication data. For example, the synchronization module 275 can confirm a time point at which the first authentication data acquisition module 261 or the second authentication data acquisition module 271 has acquired first authentication data from a reference device. The synchronization module 275 can set the confirmed time point as the reference time point. For another example, the synchronization module 275 can set a time point at which the synchronization module 275 has received first authentication data and data indicating a time point of acquiring the first authentication data from the first time provision module 263 and the second time provision module 273, as the reference time point.

In an embodiment, the synchronization module 275 can confirm the reference time point and a comparison time point at which the first authentication data acquisition module 261 or the second authentication data acquisition module 271 has acquired second authentication data from the reference device.

In an embodiment, the synchronization module 275 can identify whether the comparison time point is within a specified threshold time range (below, referred to as a 'threshold time range') with criterion of the reference time point. For example, the synchronization module 275 can identify whether the comparison time point is within a first threshold time range before the reference time point (or whether the comparison time point is an earlier time point within a first threshold time difference (or interval) than the reference time point) or is within a second threshold time range after the reference time point (or whether the comparison time point is a later time point within a second threshold time difference than the reference time point. However, the threshold time range is not limited to the aforementioned example.

In an embodiment, the synchronization module 275 can perform another operation according to whether the comparison time point is within a specified threshold time range with criterion of the reference time point.

In an embodiment, in response to confirming that the comparison time point is within the specified threshold time range with criterion of the reference time point, the synchronization module 275 can forward authentication data provided by the reference device and authentication data provided by the comparison device, to the authentication module 277.

In an embodiment, in response to confirming that the comparison time point is within the specified threshold time range with criterion of the reference time point, the synchronization module 275 can forward data (below, referred to as 'time difference data') indicating a time difference between the reference time point and the comparison time point, together with first authentication data provided by the reference device and second authentication data provided by the comparison device, to the authentication module 277.

In an embodiment, in response to confirming that the comparison time point is not within the specified threshold time range with criterion of the reference time point (or is out of the threshold time range), the synchronization module 275 can repeatedly perform the aforementioned operation (e.g., an operation of acquiring authentication data, an operation of providing data indicating a time point of acquiring the authentication data, and an operation of identifying whether the comparison time point is within the threshold time range with criterion of the reference time point) within a specified (or selected) number of times.

In an embodiment, in response to confirming that the comparison time point is not within the specified threshold time range with criterion of the reference time point, the synchronization module 275 can again set the reference time point. For example, in response to confirming that the comparison time point is not within the specified threshold time range with criterion of the reference time point, the synchronization module 275 can again set a time point at which the first authentication data acquisition module 261 or the second authentication data acquisition module 271 has acquired third authentication data provided after the acquiring first authentication data in the reference device, as the reference time point. The synchronization module 275 can confirm a time point at which the first authentication data acquisition module 261 or the second authentication data acquisition module 271 has acquired fourth authentication data provided after the acquiring the second authentication data in the comparison device.

In an embodiment, the synchronization module 275 can identify whether a comparison time point at which the first authentication data acquisition module 261 or the second authentication data acquisition module 271 has acquired fourth authentication data is within a specified threshold time range with criterion of the again set reference time point.

In an embodiment, in response to confirming that the comparison time point at which the first authentication data acquisition module 261 or the second authentication data acquisition module 271 has acquired the fourth authentication data is within the specified threshold time range with criterion of the again set reference time point, the synchronization module 275 can forward the third authentication data and the fourth authentication data to the authentication module 277. In response to confirming that the comparison time point at which the first authentication data acquisition module 261 or the second authentication data acquisition module 271 has acquired the fourth authentication data is not within the specified threshold time range with criterion of the again set reference time point, the synchronization module 275 can again set the reference time point with criterion of a time point of acquiring 1-3 authentication data provided in the reference device after the acquiring the third authentication data.

In an embodiment, the authentication module 277 can perform an operation for authenticating a user based on authentication data received from the synchronization module 275. For example, the authentication module 277 can compare authentication data acquired from the reference device and registered authentication data. The registered authentication data can have been stored in the memory 240 of the electronic device 101. The authentication module 277 can determine whether a first similarity rate of authentication data (e.g., acquired iris data) acquired from the reference device and registered authentication data (registered iris data) is equal to or is greater than a first threshold similarity rate. The authentication module 277 can compare the authentication data (e.g., acquired face data) acquired from the comparison device and registered authentication data (e.g., registered face data). The authentication module 277 can determine whether a second similarity rate of authentication data acquired from the comparison device and the registered authentication data is equal to or is greater than a second threshold similarity rate. In response to the first similarity rate being equal to or being greater than the first threshold similarity rate, and the second similarity rate being equal to or being greater than the second threshold similarity rate, the authentication module 277 can determine that a user is authenticated (or succeeds in user authentication). In response to the first similarity rate being less than the first threshold similarity rate, and/or the second similarity rate being less than the second threshold similarity rate, the authentication module 277 can determine that the user is not authenticated (or fails in user authentication).

In an embodiment, the authentication module 277 can perform an authentication operation related to authentication data acquired from an auxiliary device, as a part of an operation for authenticating a user based on authentication data received from the synchronization module 275. In an embodiment, in response to a similarity rate of authentication data acquired from the auxiliary device and registered authentication data being equal to or being greater than a threshold similarity rate (below, referred to as a 'threshold similarity rate related to an auxiliary device'), the authentication module 277 can determine that authentication related to authentication data acquired from the auxiliary device succeeds. For example, in an operation (e.g., a liveness obtaining operation) for determining an image of a user as to whether an authentication target is a real user, in response to a similarity rate of acquired authentication data and registered authentication data being equal to or being greater than a threshold similarity rate related to the auxiliary device, the authentication module 277 can determine that the authentication target is the real user.

In an embodiment, the authentication module 277 can adjust a threshold similarity rate related to the auxiliary device, based on time difference data received from the synchronization module 275. For example, as a time difference between a reference time point and a comparison time point is large, the authentication module 277 can high adjust (or set or change) the threshold similarity rate related to the auxiliary device, based on time difference data received from the synchronization module 275. As the time difference between the reference time point and the comparison time point is less, the authentication module 277 can low adjust the threshold similarity rate related to the auxiliary device. However, an embodiment is not limited to this.

In an embodiment, the authentication module 277 can confirm a quality of authentication data received from the synchronization module 275. In an embodiment, the authentication module 277 can identify whether the received authentication data has a quality enough to compare with registered authentication data, before comparing the received authentication data with the registered authentication data. For example, the authentication module 277 can identify whether a definition of a contour of a face image represented by the received authentication data is equal to or is greater than a specified definition or is less than the specified definition. However, the quality of the authentication data is not limited to the aforementioned definition. For example, the quality of the authentication data can include a brightness of the face image represented by the authentication data. In an embodiment, in response to confirming that a quality of the received authentication data is equal to or is greater than a specified quality, the authentication module 277 can compare the received authentication data with the registered data. In response to confirming that the quality of the received authentication data is less than the specified quality (or in response to confirming that the received authentication data is poor enough not to perform a comparison operation (or a matching operation) with the registered authentication data), the authentication module 277 can provide data (below, referred to as 'low-quality data') indicating that the received authentication data is less than the specified quality, without comparing the received authentication data with the registered data. In response to providing the low-quality data, the authentication module 277 can forward the provided low-quality data to the synchronization module 275.

In an embodiment, in response to confirming that the comparison time point is not within a specified threshold time range (or is out of the threshold time range) with criterion of the reference time point, the processor 250 can again (or repeatedly) perform an operation of acquiring authentication data from the senor module 210, an operation of providing data indicating a time point of acquiring the authentication data, an operation of setting the reference time point and identifying whether the comparison time point is within a specified threshold time range from the reference time point, and an operation of authenticating a user based on whether the comparison time point is within the specified threshold time range from the reference time point.

In an embodiment, in response to the number of times of repeatedly confirming that a comparison time point is not within a specified threshold time range with criterion of a reference time point exceeding the specified number of times, the processor 250 can determine that a user is not authenticated.

In an embodiment, in response to the number of times of repeatedly receiving low-quality data from the authentication module 277 exceeding the specified number of times, the processor 250 can determine that the user is not authenticated.

In an embodiment, in response to the number of times adding up the number of times of repeatedly confirming that a comparison time point is not within a specified threshold time range with criterion of a reference time point and the number of times in which the synchronization module 275 repeatedly receives low-quality data from the authentication module 277 exceeding the specified number of times, the processor 250 can determine that a user is not authenticated.

In an embodiment, the processor 250 can confirm that the number of times of repeatedly confirming that a comparison time point (e.g., a comparison time point of acquiring authentication data from a sensor corresponding to the comparison device and corresponding to the auxiliary device) related to authentication data acquired from the auxiliary device is not within a specified threshold time range with criterion of a reference time point exceeding the specified number of times. In this case, the processor 250 can perform an operation for authenticating a user, using another auxiliary device capable of providing authentication data indicating the same feature as a feature (e.g., a depth of a subject) required for authentication indicated by authentication data provided by the auxiliary device (or by replacing the existing auxiliary device with another auxiliary device).

In an embodiment, the processor 250 can differently set a threshold time range according to whether a sensor corresponds to a main device or corresponds to an auxiliary device. For example, the processor 250 can more widely set a threshold time range for a device corresponding to the auxiliary device (e.g., in response to acquiring authentication data from a device corresponding to the auxiliary device and corresponding to the comparison device), than a threshold time range for a device corresponding to the main device (e.g., in response to acquiring authentication data from a device corresponding to the main device and corresponding to the comparison device).

In an embodiment, the processor 250 can differently set a threshold time range, based on a secure level of a function related to authentication execution.

For example, in response to performing authentication related to an unlocking function whose secure level is low compared to a payment function, the processor 250 can more widely set a threshold time range which is set when authentication data is acquired from a device corresponding to an auxiliary device and corresponding to a comparison device, than a threshold time range which is set when authentication data is acquired from a device corresponding to a main device and corresponding to the comparison device. In response to performing authentication related to the payment function, the processor 250 can set the same threshold time range for cases of acquiring authentication data from a device corresponding to the auxiliary device and a device corresponding to the main device.

For another example, when performing authentication related to a locking function (e.g., a screen locking function) whose secure level is low compared to the payment function (e.g., when performing authentication for unlocking), the processor 250 can set a wide threshold time range compared to when performing authentication related to the payment function.

In an embodiment, the electronic device 101 can further include a component besides the components illustrated in FIG. 2. In an embodiment, the electronic device 101 can include components in which some of the components illustrated in FIG. 2 are omitted.

Various embodiments of a method for authenticating a user using a plurality of sensors will be described in greater detail below with reference to FIGS. 3, 4, 5, 6, 7 and FIG. 8.

An electronic device of various example embodiments of the present disclosure can include: at least one sensor, a communication circuit, at least one processor operably coupled with the at least one sensor and the communication circuit, and at least one memory operably coupled with the at least one processor. The memory can store instructions which, in response to being executed, cause the processor to: receive a request for authenticating a user of the electronic device using a specified authentication method, confirm that a device selected as a reference device is a first device among the first device and a second device which are included in the at least one sensor and the communication circuit and are capable of providing authentication data required for authenticating the user using the specified authentication method, and in response to first authentication data for authenticating the user being acquired from the first device, provide data indicating a first time point at which the processor has acquired the first authentication data, and in response to second authentication data for authenticating the user being acquired from the second device, provide data indicating a second time point at which the processor has acquired the second authentication data, and identify whether the second time point is within a threshold time range of the first time point, based on the data indicating the first time point and the data indicating the second time point, and authenticate the user using the first authentication data and the second authentication data, based on whether the second time point is within the threshold time range of the first time point.

In various example embodiments, the instructions, when executed, can cause the processor to: in response to acquiring at least one authentication data among the first authentication data or the second authentication data in a rich execution environment (REE), provide at least one data among the data indicating the first time point or the data indicating the second time point in the REE, and identify whether the second time point is within the threshold time range of the first time point, based on the at least one data among the data indicating the first time point or the data indicating the second time point in a trusted execution environment (TEE).

In various example embodiments, the instructions, when executed, can cause the processor to: in response to confirming that the second time point being within the threshold time range of the first time point, authenticate the user using the first authentication data and the second authentication data.

In various example embodiments, the instructions, when executed, can set the processor to: identify whether at least one authentication data among the first authentication data or the second authentication data is authentication data which does not include unique information of the user but is required for authenticating the user, and in response to confirming that the at least one authentication data is the authentication data which does not include the unique information of the user but is required for authenticating the user, adjust a threshold similarity rate to be compared with a similarity rate between the at least one authentication data and registered authentication data, based on a time difference between the first time point and the second time point.

In various example embodiments, the instructions, when executed, can cause the processor to: in response to confirming that the second time point is not within the threshold time range of the first time point, acquire third authentication data provided by the first device after the acquiring the first authentication data and provide data indicating a third time point at which the processor has acquired the first authentication data, and acquire fourth authentication data provided by the second device after the acquiring the second authentication data and provide data indicating a fourth time point at which the processor 250 has acquired the fourth authentication data, and identify whether the fourth time point is within a threshold time range of the third time point, based on the data indicating the third time point and the data indicating the fourth time point, and authenticate the user using the third authentication data and the fourth authentication data, based on whether the fourth time point is within the threshold time range of the third time point.

In various example embodiments, the instructions, when executed, cause the processor to: in response to confirming that the second time point is within the threshold time range of the first time point, confirm a first quality of the first authentication data and a second quality of the second authentication data, and identify whether at least one of the first quality or the second quality is equal to or is less than a specified quality, and in response to confirming that the at least one of the first quality or the second quality is equal to or is less than the specified quality, provide data indicating that the at least one of the first quality or the second quality is equal to or is less than the specified quality.

In various example embodiments, the instructions, when executed, cause the processor to: identify whether the added number of times adding up the number of times of confirming that the second time point is not within the threshold time range of the first time point and the number of times of providing the data indicating that the at least one of the first quality or the second quality is equal to or is less than the specified quality is less than the specified number of times, and in response to the added number of times being less than the specified number of times, perform an operation of providing the data indicating the third time point, an operation of providing the data indicating the fourth time point, an operation of identifying whether the fourth time point is within the threshold time range of the third time point, and an operation of authenticating the user using the third authentication data and the fourth authentication data.

In various example embodiments, the instructions, when executed, cause the processor to: in response to the added number of times being equal to or being greater than the specified number of times, and the second device being a device which provides authentication data which does not include unique information of the user but is required for authenticating the user, authenticate the user, by, in replacement of the second device, using a third device capable of providing authentication data indicating the same feature as a feature required for authentication indicated by the authentication data provided by the second device, and the first device.

In various example embodiments, the instructions, when executed, can set the processor to: in response to the added number of times being equal to or being greater than the specified number of times, and the second device being a device which provides authentication data which includes unique information of the user, determine that the user is not authenticated.

In various example embodiments, the instructions, when executed, can cause the processor to: confirm a secure level which is set to a function related to the specified authentication method, and adjust the threshold time range based on the secure level.

In various example embodiments, the instructions, when executed, cause the processor to: select the first device among the first device and the second device, as the reference device, based on a falsification difficulty of the authentication data which is provided by the first device and second device and includes unique information of the user, or frames per second (FPS) of the first device and second device providing the authentication data.

In various example embodiments, the instructions, when executed, cause the processor to: set the first sensor among the first device and the second device, as the reference device, based on situation information.

Figure 3:
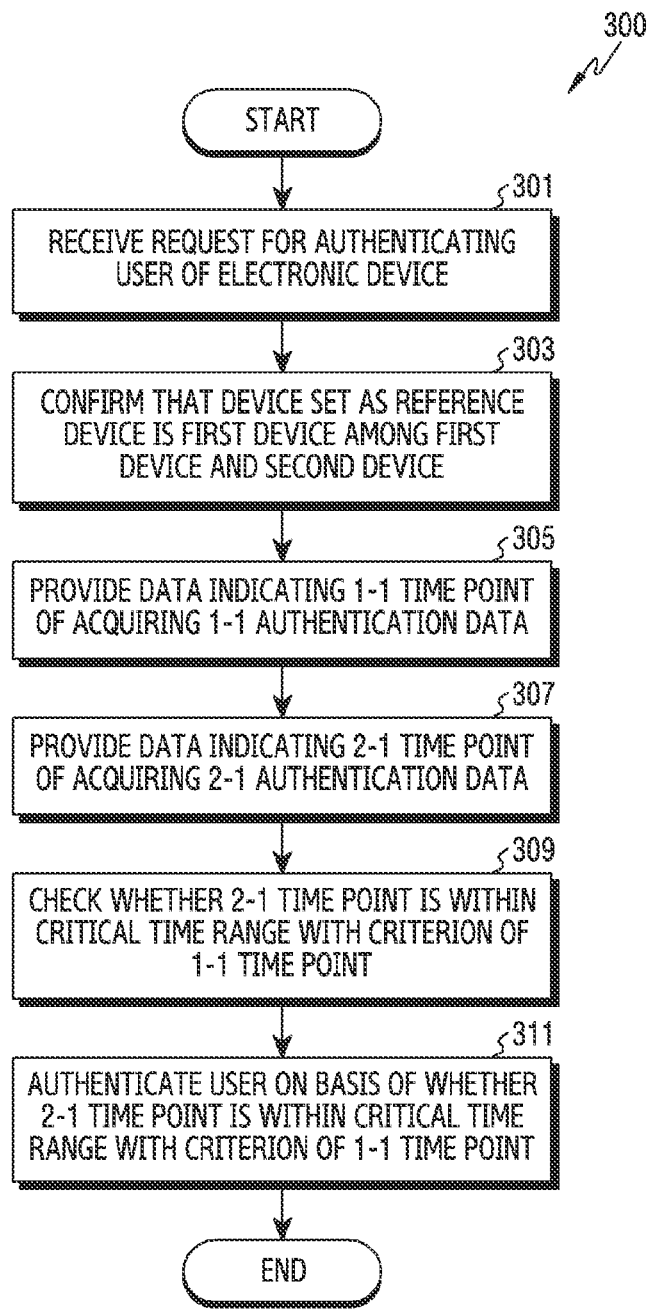
FIG. 3 is a flowchart illustrating an example method for authenticating a user, according to various embodiments.

FIG. 3 is a flowchart 300 illustrating an example method for authenticating a user, according to various embodiments.

Figure 4:
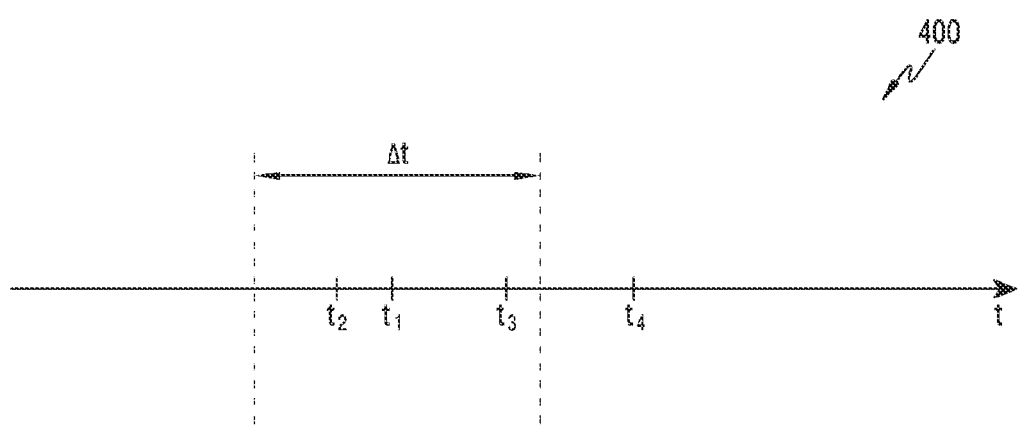
FIG. 4 is a diagram illustrating an example method for authenticating a user, according to various embodiments.

FIG. 4 is a diagram 400 illustrating an example method for authenticating the user, according to various embodiments.

Referring to FIG. 3 and FIG. 4, in operation 301, in an embodiment, the processor 250 can receive a request for authenticating a user of the electronic device 101 using a specified authentication method.

In an embodiment, the processor 250 can receive an input for executing a function related to authentication execution (e.g., a locking function (or an unlocking function) and a payment function) or an application related to authentication execution. In an embodiment, the processor 250 can confirm an authentication method specified for (or set to) the function related to the authentication execution. For example, the processor 250 can confirm that an authentication method specified for unlocking is an authentication method which uses face data and depth data. For another example, the processor 250 can confirm that an authentication method specified for payment is an authentication method which uses face data and iris data.

In an embodiment, the processor 250 can confirm a secure level which is set to the function related to the authentication execution. In an embodiment, the processor 250 can set a higher secure level (or a level requiring high security) than the locking function, to the payment function.

In operation 303, in an embodiment, the processor 250 can identify whether a device selected as a reference device is a first device, among the first device and a second device which are included in the sensor module 210 and communication circuit 220 capable of providing authentication data required for authenticating a user using the specified authentication method.

In an embodiment, the processor 250 can confirm that devices capable of providing data required for performing authentication in the specified authentication method are the first device and the second device among the devices included in the sensor module 210 and communication circuit 220. Below, a description is made assuming that the devices capable of providing data required for performing authentication in the specified authentication method are the first device and the second device among the plurality of devices, but an embodiment is not limited to this. For example, even when the devices capable of providing data required for performing authentication in the specified authentication method are three or more among the plurality of devices, it can be applied identically or similarly with operations which will described below.

In an embodiment, the processor 250 can confirm that the device set as the reference device is the first device among the first device and the second device.

In an embodiment, the processor 250 can set the device capable of providing authentication data having high security among the first device and the second device, as a reference device. For example, the processor 250 can set an iris sensor providing iris data which, compared to face data, includes an inherent feature and is difficult to be falsified (or has high security) among an image sensor providing face data and the iris sensor providing the iris data, as the reference device. In an embodiment, among the first device and the second device, the second device not being the reference device can be set as a comparison device.

In an embodiment, the processor 250 can set the device whose cycle (or a frame per second (FPS)) of providing authentication data is short among the first device and the second device, as the reference device.

In an embodiment, at electronic device 101, the processor 250 can set one device among a plurality of devices capable of providing authentication data required for performing authentication in a specified authentication method, as the reference device.

In an embodiment, the processor 250 can set (or change) the reference device among the plurality of devices, based on situation information. For example, in response to the electronic device 101 being in a bright environment (e.g., an environment in which a sensor receives light of a specified amount or more), the processor 250 can set a device capable of providing authentication data whose security is highest among the plurality of devices, as the reference device. In response to the electronic device 101 moving from the bright environment to a dark environment (e.g., an environment in which the sensor receives light less than a specified amount), the processor 250 can set (or change) the device whose cycle of providing authentication data is shortest among the plurality of devices, as the reference device.

However, the method in which the processor 250 sets the reference device among the plurality of devices is not limited to the aforementioned example.

In operation 305, in an embodiment, in response to the processor 250 (e.g., the first authentication data acquisition module 261 or the second authentication data acquisition module 271) acquiring first authentication data for authenticating a user from the first device, the processor 250 (e.g., the first time provision module 263 or the second time provision module 273) can generate first data indicating a first time point of acquiring the first authentication data from the first device.

In an embodiment, the processor 250 (e.g., the first authentication data acquisition module 261 or the second authentication data acquisition module 271) can acquire authentication data from the sensor module 210 (or the communication circuit 220). For example, the processor 250 (e.g., the first authentication data acquisition module 261) can acquire (or confirm) depth data on a subject which is provided by a TOF sensor and is stored in the memory 240 (e.g., an REE (or a normal region) within the memory 240). For another example, the processor 250 (e.g., the second authentication data acquisition module 271) can acquire (or confirm) iris data on the subject which is provided by an iris sensor and is stored in the memory 240 (e.g., a TEE (or a secure region) within the memory 240).

In an embodiment, the processor 250 (e.g., the first time provision module 263 or the second time provision module 273) can provide data indicating a time point at which the processor 250 (e.g., the first authentication data acquisition module 261 or the second authentication data acquisition module 271) has acquired the first authentication data, in a time stamp, index or count form (or method). However, the form of providing the data indicating the time point at which the processor 250 has acquired the first authentication data is not limited to the aforementioned example.

In an embodiment, the processor 250 (e.g., the first time provision module 263 or the second time provision module 273) can forward the data indicating the first time point, together with the first authentication data, to the processor 250 (e.g., the synchronization module 275). In an embodiment, the processor 250 (e.g., the first time provision module 263) can forward the first authentication data and the data indicating the first time point to the processor 250 (e.g., the synchronization module 275).

In operation 307, in an embodiment, in response to the processor 250 (e.g., the first authentication data acquisition module 261 or the second authentication data acquisition module 271) acquiring second authentication data for authenticating a user from the second device, the processor 250 (e.g., the first time provision module 263 or the second time provision module 273) can generate second data indicating a second time point of acquiring the second authentication data from the second device.

In an embodiment, the processor 250 (e.g., the first time provision module 263 or the second time provision module 273) can provide the data indicating the time point at which the processor 250 has acquired the second authentication data, in a time stamp, index or count form (or method).

In an embodiment, the processor 250 (e.g., the first time provision module 263 or the second time provision module 273) can forward the data indicating the second time point, together with the second authentication data, to the processor 250 (e.g., the synchronization module 275).

In FIG. 3, it is illustrated that operation 305 is performed ahead of operation 307, but an embodiment is not limited to this. For example, operation 307 can be performed ahead of operation 305.

In operation 309, in an embodiment, the processor 250 can identify whether the second time point is within a threshold time range of the first time point, based on the data indicating the first time point and the data indicating the second time point.

In an embodiment, the processor 250 (e.g., the synchronization module 275) can confirm the first time point and the second time point, based on the data indicating the first time point and the data indicating the second time point.

In an embodiment, the processor 250 (e.g., the synchronization module 275) can set the first time point as a reference time point. In an embodiment, the processor 250 (e.g., the synchronization module 275) can set a time point at which the processor 250 (e.g., the synchronization module 275) has received the first authentication data and the data indicating the first time point from the processor 250 (e.g., the first time provision module 263 or the second time provision module 273), as the reference time point.

In an embodiment, the processor 250 (e.g., the synchronization module 275) can confirm a time point at which the processor 250 (e.g., the first time provision module 263 or the second time provision module 273) has acquired the second authentication data from the second device (or the comparison device) from the set reference time point, as a comparison time point.

In an embodiment, in response to the processor 250 (e.g., the synchronization module 275) setting the time point of receiving the first authentication data and the data indicating the first time point from the processor 250 (e.g., the first time provision module 263 or the second time provision module 273), the processor 250 (e.g., the synchronization module 275) can confirm a time point at which the processor 250 (e.g., the synchronization module 275) has received the second authentication data and the data indicating the second time point from the processor 250 (e.g., the first time provision module 263 or the second time provision module 273), as the comparison time point.

In an embodiment, in response to the processor 250 (e.g., the synchronization module 275) setting the reference time point and confirming the comparison time point, the processor 250 (e.g., the synchronization module 275) can identify whether the second time point is (or is included) within a threshold time range with criterion of the first time point.

In an embodiment, in FIG. 4, in response to the first time point (or the reference time point) being set as t1, the processor 250 can set a threshold time range (Δt) whose range is determined by a time point preceding (or earlier) and a time point following (or later) as much as a specified time difference with criterion of t1. However, the method for setting the threshold time range is not limited to the aforementioned example. For example, the processor 250 can set the threshold time range whose range is determined by t1 and a time point following as much as the specified time difference with criterion of t1.

In an embodiment, in FIG. 4, in response to the second time point (or the comparison time point) being confirmed as t2 or t3, the processor 250 can confirm that the second time point is within the threshold time range (Δt) with criterion of the first time point. In an embodiment, in FIG. 4, in response to the second time point (or the comparison time point) being confirmed as t4, the processor 250 can confirm that the second time point is not within (or is out of) the threshold time range (Δt) with criterion of the first time point.

Though not illustrated in FIG. 4, in an embodiment, the second authentication data can be authentication data that the processor 250 has acquired from the second device, between a time point at which the processor 250 has acquired authentication data which is provided soon after the acquiring the first authentication data (e.g., is provided by the reference device at a next cycle after the acquiring the first authentication data), and a time point at which the processor 250 has acquired authentication data which is provided just before the acquiring the first authentication data (e.g., is provided by the reference device at a previous cycle before the acquiring the first authentication data). However, an embodiment is not limited to this.

Though not illustrated in FIG. 3 and FIG. 4, in an embodiment, in response to an authentication data provision cycle of the first device (or the reference device) being longer than an authentication data provision cycle of the second device (or the comparison device), the processor 250 can confirm that a plurality of comparison time points (e.g., t2 and t3) acquired from the second device are (or are included) within the threshold time range (Δt) with criterion of the reference time point (e.g., t1).

Though not illustrated in FIG. 3, in an embodiment, the processor 250 can differently set the threshold time range, based on a secure level of a function related to authentication execution. For example, when performing authentication related to a locking function (e.g., a screen locking function) whose secure level is low compared to a payment function (e.g., when performing authentication for unlocking), the processor 250 can set a wide threshold time range compared to when performing authentication related to the payment function.

In operation 311, in an embodiment, the processor 250 can authenticate a user using the first authentication data and the second authentication data, based on whether the second time point is within the threshold time range with criterion of the first time point.

In relation to an operation in which the processor 250 of operation 311 authenticates the user using the first authentication data and the second authentication data based on whether the second time point is within the threshold time range with criterion of the first time point, a detailed description will be made below with reference to FIGS. 5, 6, 7, and FIG. 8.

Figure 5:
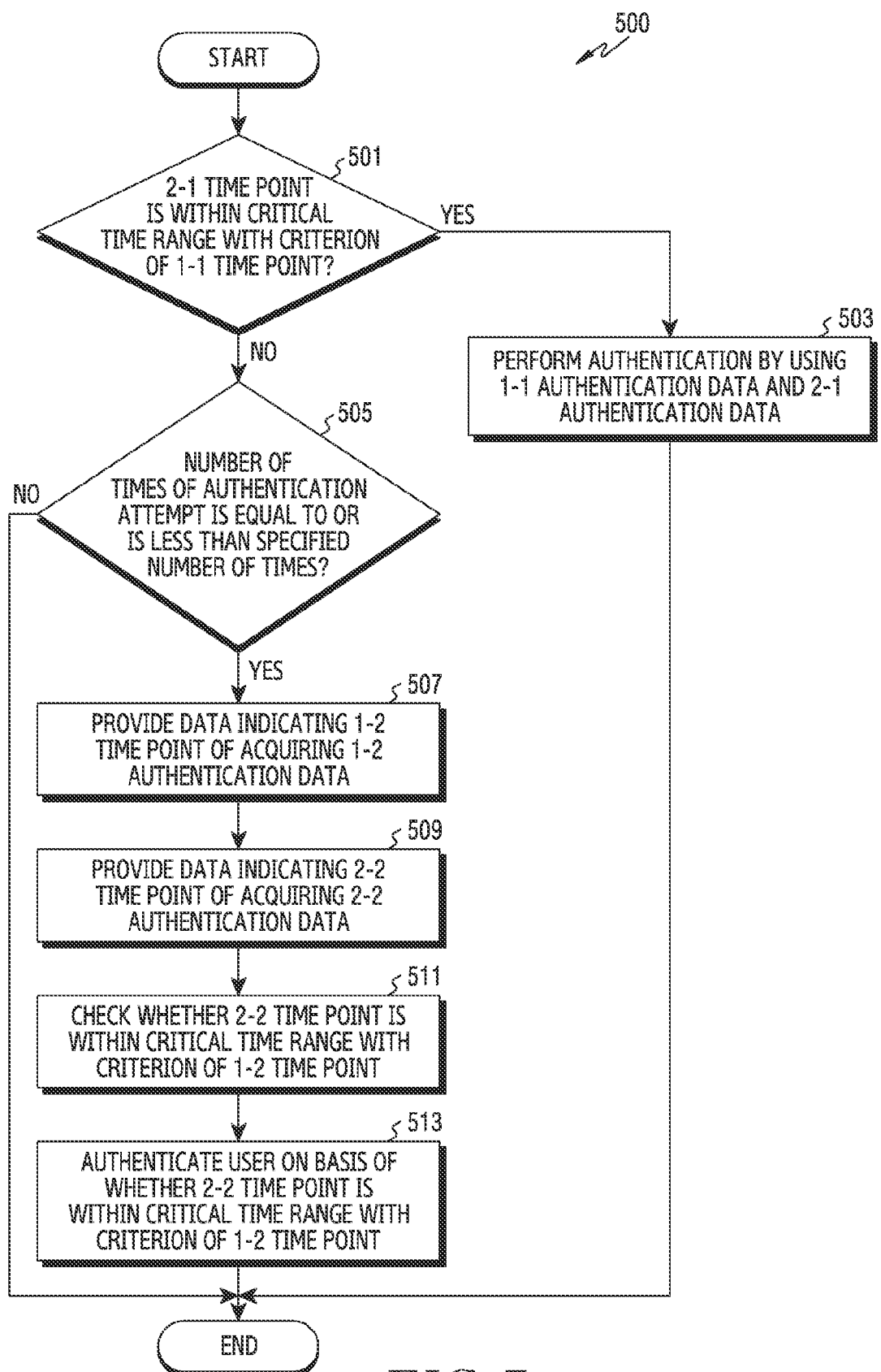
FIG. 5 is a flowchart illustrating an example method for authenticating a user using authentication data based on whether a comparison time point is within a threshold time range with criterion of a reference time point, according to various embodiments.

FIG. 5 is a flowchart 500 illustrating an example method for authenticating a user using authentication data based on whether a comparison time point is within a threshold time range with criterion of a reference time point, according to various embodiments. In an embodiment, operations of FIG. can be operations included in operation 311 of FIG. 3.

Referring to FIG. 5, in response to the processor 250 (e.g., the synchronization module 275) confirming in operation 501 that a second time point is within a specified threshold time range with criterion of a first time point, in operation 503, in an embodiment, the processor 250 (e.g., the authentication module 277) can perform authentication using first authentication data and third authentication data.

In an embodiment, in response to the processor 250 (e.g., the synchronization module 275) confirming that the second time point is within the specified threshold time range with criterion of the first time point, the processor 250 (e.g., the synchronization module 275) can forward the first authentication data and the second authentication data to the processor 250 (e.g., the authentication module 277).

In an embodiment, in response to the processor 250 (e.g., the synchronization module 275) confirming that a plurality of comparison time points (e.g., t2 and t3) acquired from a second device exit (or are included) within a threshold time range (Δt) with criterion of a reference time point (e.g., t1), the processor 250 (e.g., the synchronization module 275) can forward only authentication data (e.g., authentication data acquired at t2) acquired at a time point which is close to the reference time point (e.g., t1) (or whose time difference from the reference time point is less) among comparison time points (e.g., t2 and t3), together with the first authentication data, to the processor 250 (e.g., the authentication module 277).

In an embodiment, the processor 250 (e.g., the authentication module 277) can perform an operation for authenticating a user based on the authentication data received from the processor 250 (e.g., the synchronization module 275). For example, the processor 250 (e.g., the authentication module 277) can compare the first authentication data acquired from the first device and registered authentication data. The processor 250 (e.g., the authentication module 277) can determine whether a first similarity rate of the first authentication data (e.g., acquired iris data) and the registered authentication data (registered iris data) is equal to or is greater than a first threshold similarity rate. The processor 250 (e.g., the authentication module 277) can compare the second authentication data (e.g., acquired face data) acquired from the second device and the registered authentication data (e.g., registered face data). The processor 250 (e.g., the authentication module 277) can determine whether a second similarity rate of the second authentication data acquired from the second device and the registered authentication data is equal to or is greater than a second threshold similarity rate. In response to the first similarity rate being equal to or being greater than the first threshold similarity rate, and the second similarity rate being equal to or being greater than the second threshold similarity rate, the processor 250 (e.g., the authentication module 277) can determine that the user is authenticated (or succeeds in user authentication). In response to the first similarity rate being less than the first threshold similarity rate, and/or the second similarity rate being less than the second threshold similarity rate, the processor 250 (e.g., the authentication module 277) can determine that the user is not authenticated (or fails in user authentication).

In an embodiment, the processor 250 (e.g., the authentication module 277) can perform an authentication operation related to authentication data acquired from an auxiliary device, as a part of an operation for authenticating the user based on the authentication data received from the processor 250 (e.g., the synchronization module 275). In an embodiment, in response to a similarity rate of the authentication data acquired from the auxiliary device and the registered authentication data being equal to or being greater than a threshold similarity rate related to the auxiliary device, the processor 250 (e.g., the authentication module 277) can determine that authentication related to the authentication data acquired from the auxiliary device succeeds. For example, in an operation (e.g., a liveness obtaining operation) for determining an image of a user as to whether an authentication target is a real user, in response to the similarity rate of the acquired authentication data and the registered authentication data being equal to or being greater than the threshold similarity rate related to the auxiliary device, the processor 250 (e.g., the authentication module 277) can determine that the authentication target is the real user.

In an embodiment, the processor 250 (e.g., the authentication module 277) can confirm the qualities of the first authentication data and the second authentication data received from the processor 250 (e.g., the synchronization module 275). In an embodiment, before comparing the first authentication data and the second authentication data with the registered authentication data (as a previous operation for comparison), the processor 250 (e.g., the authentication module 277) can identify whether the first authentication data and the second authentication data have a quality enough to compare with the registered authentication data. For example, the processor 250 (e.g., the authentication module 277) can identify whether a definition of a contour of a face image represented by the first authentication data is equal to or is greater than a specified definition or is less than the specified definition. However, the quality of the authentication data is not limited to the aforementioned definition. For example, the quality of the authentication data can include a brightness of a face image represented by the authentication data. In an embodiment, in response to confirming that the qualities of the first authentication data and the second authentication data being equal to or being greater than a specified quality, the processor 250 (e.g., the authentication module 277) can compare the first authentication data and the second authentication data with the registered data. In response to confirming that the quality of the first authentication data and/or the quality of the second authentication data being less than a specified quality, the processor 250 (e.g., the authentication module 277) can provide low-quality data indicating that the first authentication data and the second authentication data are less than the specified quality, without comparing the first authentication data and the second authentication data with the registered data. In response to providing the low-quality data, the processor 250 (e.g., the authentication module 277) can forward the provided low-quality data to the processor 250 (e.g., the synchronization module 275).

In response to the processor 250 (e.g., the synchronization module 275) confirming in operation 501 that the second time point is not within the specified threshold time range with criterion of the first time point, in operation 505, in an embodiment, the processor 250 (e.g., the synchronization module 275) can identify whether the number of times of authentication attempt is equal to or is less than the specified number of times.

In an embodiment, the number of times of authentication attempt can include the number of times in which the processor 250 (e.g., the synchronization module 275) continuously and repeatedly confirms that a comparison time point is not within a specified threshold time range with criterion of a reference time point.

In an embodiment, the number of times of authentication attempt can include the number of times adding up the number of times in which the processor 250 (e.g., the synchronization module 275) repeatedly confirms that the comparison time point is not within the specified threshold time range with criterion of the reference time point, and the number of times in which the processor 250 (e.g., the synchronization module 275) receives low-quality data related to at least one authentication data among a plurality of authentication data from the processor 250 (e.g., the authentication module 277).

In an embodiment, the number of times of authentication attempt can include the number of times in which the processor 250 (e.g., the synchronization module 275) receives the low-quality data from the processor 250 (e.g., the authentication module 277).

In an embodiment, the number of times of authentication attempt can be determined, in consideration of all of whether the time point of acquiring the authentication data from the second device is within the threshold time range, and the qualities of authentication data acquired from the first device and authentication data acquired from the second device. For example, in response to it being confirmed that the time point of acquiring authentication data from the second device (or the comparison device) is within the threshold time range, and the quality of the authentication data acquired from the second device (or the comparison device) is equal to or is greater than a specified quality but the quality of the authentication data acquired from the first device (or the reference device) is less than the specified quality (or in response to receiving the low-quality data in relation to the authentication data acquired from the first device (or the reference device), the processor 250 can determine that authentication has been attempted one time (or can increase the number of times of authentication attempt by one).

In an embodiment, in response to the processor 250 (e.g., the synchronization module 275) confirming that the number of times of authentication attempt exceeds the specified number of times, the processor 250 can determine that a user is not authenticated (or fails in user authentication).

In an embodiment, in response to the processor 250 (e.g., the synchronization module 275) confirming in operation 505 that the number of times of authentication attempt is equal to or is less than the specified number of times, in operation 507, the processor 250 can acquire third authentication data for authenticating a user from the first device, and generate third data indicating a third time point of acquiring the third authentication data from the first device.

In an embodiment, the third authentication data can be authentication data that the first device provides after the acquiring the first authentication data. In an embodiment, the third authentication data can be authentication data that the first device provides after the processor 250 confirms that the second time point is not within the specified threshold time range with criterion of the first time point. In an embodiment, the third authentication data can be authentication data that the first device provides after the processor 250 (e.g., the synchronization module 275) receives the low-quality data from the processor 250 (e.g., the authentication module 277). In an embodiment, the third authentication data can be authentication data that is provided soon after the acquiring the first authentication data (e.g., that the first device (or the reference device) provides at a next cycle after the acquiring the first authentication data).

In an embodiment, the processor 250 (e.g., the first time provision module 263 or the second time provision module 273) can provide the data indicating the third time point of acquiring the third authentication data, in a time stamp, index or count form (or method).

In operation 509, in an embodiment, the processor 250 can acquire fourth authentication data for authenticating a user from the second device, and generate fourth data indicating a fourth time point of acquiring the fourth authentication data from the second device.

In an embodiment, the fourth authentication data can be authentication data that the first device provides after the acquiring the second authentication data. In an embodiment, the fourth authentication data can be authentication data that the second device provides after the processor 250 confirms that the second time point is not within the specified threshold time range with criterion of the first time point. In an embodiment, the fourth authentication data can be authentication data that the second device provides after the processor 250 (e.g., the synchronization module 275) receives the low-quality data from the processor 250 (e.g., the authentication module 277). In an embodiment, the fourth authentication data can be authentication data which is provided soon after the acquiring the second authentication data (e.g., that the second device (or the comparison device) provides at a next cycle after the acquiring the first authentication data). In an embodiment, the fourth authentication data can be the second authentication data. For example, the fourth authentication data can be the second authentication data that the processor 250 has acquired at the third time point which is out of the threshold time range with criterion of the first time point.

In an embodiment, the processor 250 (e.g., the first time provision module 263 or the second time provision module 273) can provide the data indicating the fourth time point of acquiring the fourth authentication data, in a time stamp, index or count form (or method).

In FIG. 5, it is illustrated that operation 507 is performed ahead of operation 509, but an embodiment is not limited to this. For example, operation 509 can be performed ahead of operation 507.

In operation 511, in an embodiment, the processor 250 can identify whether the fourth time point is within the threshold time range with criterion of the third time point, based on the data indicating the third time point and the data indicating the fourth time point.

In an embodiment, the processor 250 can confirm the third time point and the fourth time point, based on the data indicating the third time point and the data indicating the fourth time point.

In an embodiment, the processor 250 (e.g., the synchronization module 275) can set the third time point as a reference time point. In an embodiment, the processor 250 (e.g., the synchronization module 275) can confirm a time point at which the processor 250 (e.g., the first authentication data acquisition module 261 or the second authentication data acquisition module 271) has acquired the fourth authentication data from the second device (or the comparison device) from a set reference time point, as the comparison time point.

In an embodiment, in response to the processor 250 (e.g., the synchronization module 275) setting the reference time point and confirming the comparison time point, the processor 250 (e.g., the synchronization module 275) can identify whether the fourth time point is (or is included) within the threshold time range with criterion of the third time point.

In operation 513, in an embodiment, the processor 250 can authenticate a user using the third authentication data and the fourth authentication data, based on whether the fourth time point is within the threshold time range with criterion of the third time point. For example, the processor 250 can repeatedly perform the same or similar operation with operation 501 to operation 511 described above.

Figure 6:
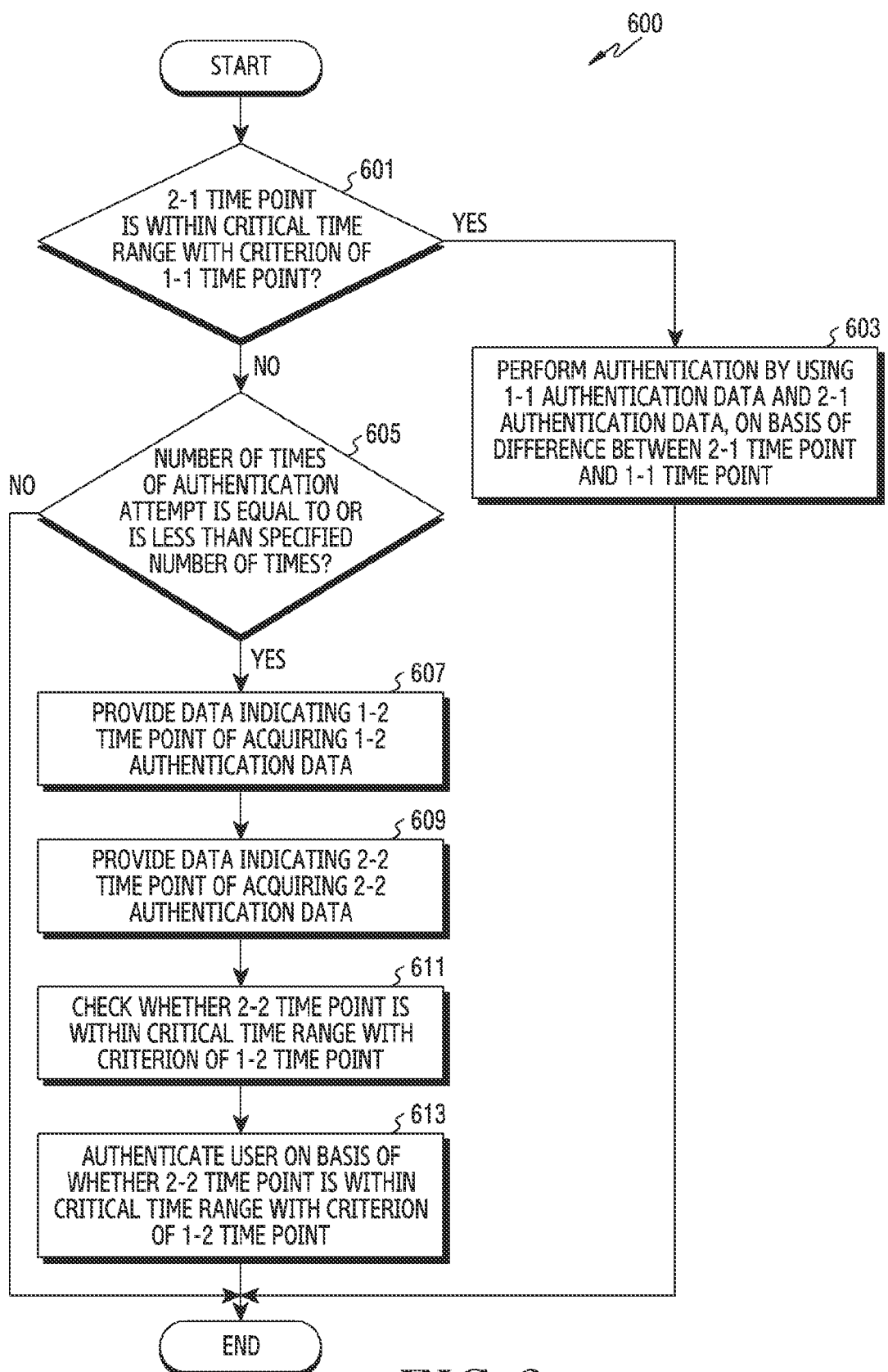
FIG. 6 is a flowchart illustrating an example method for authenticating a user based on a difference between a reference time point and a comparison time point, according to various embodiments.

FIG. 6 is a flowchart 600 illustrating an example method for authenticating a user based on a difference between a reference time point and a comparison time point, according to various embodiments. In an embodiment, operations of FIG. 6 can be operations included in operation 311 of FIG. 3.

In response to the processor 250 (e.g., the synchronization module 275) confirming in operation 601 that a second time point is within a specified threshold time range with criterion of a first time point, in operation 603, in an embodiment, the processor 250 (e.g., the authentication module 277) can perform authentication using first authentication data and third authentication data, based on a difference (or time difference data) between the first time point and the second time point.

In an embodiment, in response to the processor 250 (e.g., the synchronization module 275) confirming that the second time point is within the specified threshold time range with criterion of the first time point, the processor 250 (e.g., the synchronization module 275) can forward data indicating the difference between the first time point and the second time point, together with the first authentication data and the second authentication data, to the processor 250 (e.g., the authentication module 277).

In an embodiment, the processor 250 (e.g., the authentication module 277) can adjust (or change) a threshold similarity rate related to an auxiliary device, based on the data indicating the difference between the first time point and the second time point.

In an embodiment, the processor 250 (e.g., the authentication module 277) can perform an authentication operation related to authentication data acquired from the auxiliary device, as a part of an operation for authenticating the user based on authentication data received from the processor 250 (e.g., the synchronization module 275). In an embodiment, in response to a similarity rate of the authentication data acquired from the auxiliary device and registered authentication data being equal to or being greater than a threshold similarity rate related to the auxiliary device, the processor 250 (e.g., the authentication module 277) can determine that authentication related to the authentication data acquired from the auxiliary device succeeds. For example, in an operation (e.g., a liveness obtaining operation) for determining an image of a user as to whether an authentication target is a real user, in response to the similarity rate of the acquired authentication data and the registered authentication data being equal to or being greater than the threshold similarity rate related to the auxiliary device, the processor 250 (e.g., the authentication module 277) can determine that the authentication target is the real user. In response to the similarity rate of the acquired authentication data and the registered authentication data being equal to or being greater than the threshold similarity rate related to the auxiliary device, the processor 250 (e.g., the authentication module 277) can determine that the authentication target is the image of the user.

In an embodiment, the processor 250 (e.g., the authentication module 277) can adjust the threshold similarity rate related to the auxiliary device, based on the time difference data received from the processor 250 (e.g., the synchronization module 275). For example, as a time difference between the reference time point and the comparison time point is large, the processor 250 (e.g., the authentication module 277) can high adjust (or set or change) the threshold similarity rate related to the auxiliary device, based on the time difference data received from the processor 250 (e.g., the synchronization module 275). As the time difference between the reference time point and the comparison time point is less, the processor 250 (e.g., the authentication module 277) can low adjust the threshold similarity rate related to the auxiliary device. However, an embodiment is not limited to this.

In an embodiment, the processor 250 (e.g., the authentication module 277) may not adjust a threshold similarity rate related to a main device, irrespective of the time difference data received from the processor 250 (e.g., the synchronization module 275). However, an embodiment is not limited to this.

In an embodiment, the processor 250 (e.g., the authentication module 277) can adjust a threshold quality degree which will compare with a quality degree of acquired authentication data (e.g., a threshold quality degree for determining whether a quality of authentication data corresponds to a low-quality), based on the data indicating the difference between the first time point and the second time point. For example, as the time difference between the reference time point and the comparison time point is large, the processor 250 (e.g., the authentication module 277) can high adjust (or set or change) the threshold quality degree, based on the time difference data received from the processor 250 (e.g., the synchronization module 275). As the time difference between the reference time point and the comparison time point is less, the processor 250 (e.g., the authentication module 277) can low adjust the threshold quality degree.

In an embodiment, the processor 250 (e.g., the authentication module 277) can authenticate a user (or can perform a matching operation with the registered authentication data) using the first authentication data and the second authentication data, based on at least one of the threshold similarity rate or the threshold quality degree adjusted based on the data indicating the difference between the first time point and the second time point.

The operation in which the processor 250 (e.g., the authentication module 277) authenticates the user using the first authentication data and the second authentication data, based on at least one of the threshold similarity rate or threshold quality degree adjusted based on the data indicating the difference between the first time point and the second time point, is at least partially the same as or similar with operation 503 of FIG. 5 and thus, a detailed description is omitted.

In an embodiment, operation 605 to operation 613 are at least partially the same as or similar with operation 505 to operation 513 of FIG. 5 and thus, a detailed description is omitted.

Figure 7:
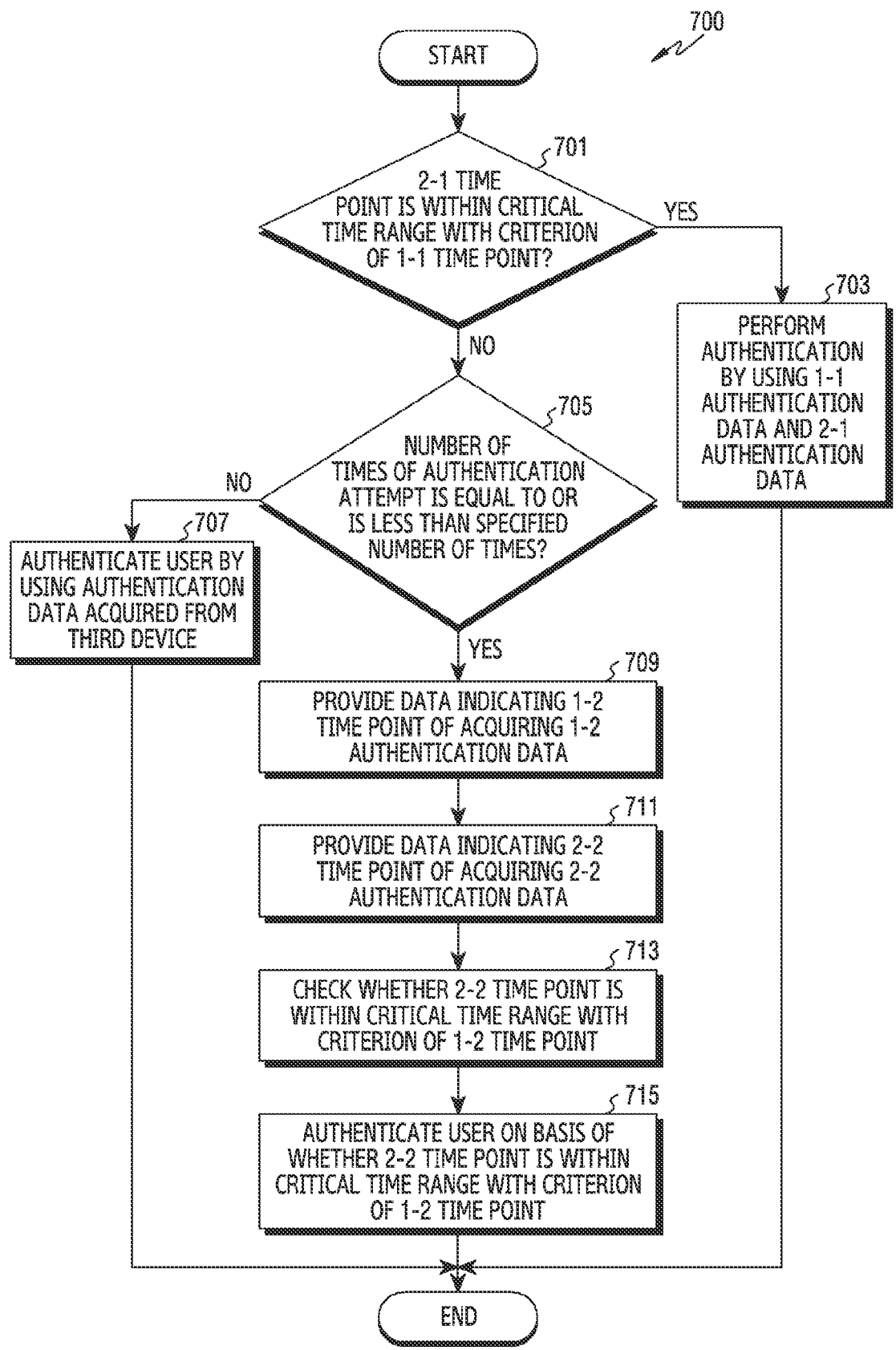
FIG. 7 is a flowchart illustrating an example method for authenticating a user using authentication data acquired from another auxiliary sensor, according to various embodiments.

FIG. 7 is a flowchart illustrating an example method for authenticating a user using authentication data acquired from another auxiliary sensor, according to various embodiments. In an embodiment, operations of FIG. 7 can be operations included in operation 311 of FIG. 3.

Below, in FIG. 7, a description will be made on the assumption that a first device corresponds to a reference device and corresponds to a main device, and a second device corresponds to a comparison device and corresponds to an auxiliary device.

In response to the processor 250 (e.g., the synchronization module 275) confirming in operation 701 that a second time point is within a specified threshold time range with criterion of a first time point, in operation 703, in an embodiment, the processor 250 (e.g., the authentication module 277) can perform authentication using first authentication data and second authentication data.

In an embodiment, operation 703 is at least partially the same as or similar with operation 503 of FIG. 5 or operation 603 of FIG. 6 and thus, a detailed description may not be repeated here.

In response to the processor 250 (e.g., the synchronization module 275) confirming in operation 701 that the second time point is not within the specified threshold time range with criterion of the first time point, in operation 705, in an embodiment, the processor 250 (e.g., the synchronization module 275) can identify whether the number of times of authentication attempt related to a second device (or an auxiliary device) is equal to or is less than the specified number of times.

In an embodiment, the number of times of authentication attempt related to the second device can include the number of times in which the processor 250 (e.g., the synchronization module 275) repeatedly confirms that a comparison time point is not within a specified threshold time range with criterion of a reference time point.

In an embodiment, the number of times of authentication attempt related to the second device can include the number of times adding up the number of times in which the processor 250 (e.g., the synchronization module 275) repeatedly confirms that the comparison time point is not within the specified threshold time range with criterion of the reference time point, and the number of times in which the processor 250 (e.g., the synchronization module 275) repeatedly receives low-quality data related to authentication data acquired from the second device, from the processor 250 (e.g., the authentication module 277).

In an embodiment, the number of times of authentication attempt related to the second device can include the number of times in which the processor 250 (e.g., the synchronization module 275) receives the low-quality data related to the authentication data acquired from the second device, from the processor 250 (e.g., the authentication module 277).

In response to the processor 250 (e.g., the synchronization module 275) confirming in operation 705 that the number of times of authentication attempt related to the second device (or the auxiliary device) exceeds the specified number of times, in operation 707, in an embodiment, the processor 250 can authenticate the user using authentication data acquired from a third device.

In an embodiment, the third device can be another auxiliary device capable of providing authentication data indicating the same feature as a feature (e.g., a depth for a subject) required for authentication indicated by the authentication data provided by the second device.

Though not illustrated in FIG. 7, in an embodiment, the processor 250 can perform an operation of authenticating the user using the authentication data acquired from the third device and the authentication data acquired from the first device. For example, the processor 250 can perform an operation which is at least partially the same or similar with an operation explained through FIG. 3 to FIG. 6, using the first device, and the third device replacing the second device.

In response to the processor 250 (e.g., the synchronization module 275) confirming in operation 705 that the number of times of authentication attempt related to the second device (or the auxiliary device) is equal to or is less than the specified number of times, the processor 250 can perform operation 709 to operation 715 using the first device and the second device.

In FIG. 7, a description is made on the assumption that the second device corresponds to the comparison device and corresponds to the auxiliary device but, in an embodiment, in response to the second device corresponding to the comparison device and corresponding to the main device, the processor 250 can perform operations which are at least partially the same as or similar with operations of FIG. 5 and FIG. 6. For example, in response to the second device corresponding to the main device, in response to the number of times of authentication attempt related to the second device exceeding the specified number of times, the processor 250 can determine that the user is not authenticated (or fails in user authentication) without replacing the second device with another sensor (e.g., a third sensor). However, an embodiment is not limited to this.

Figure 8:
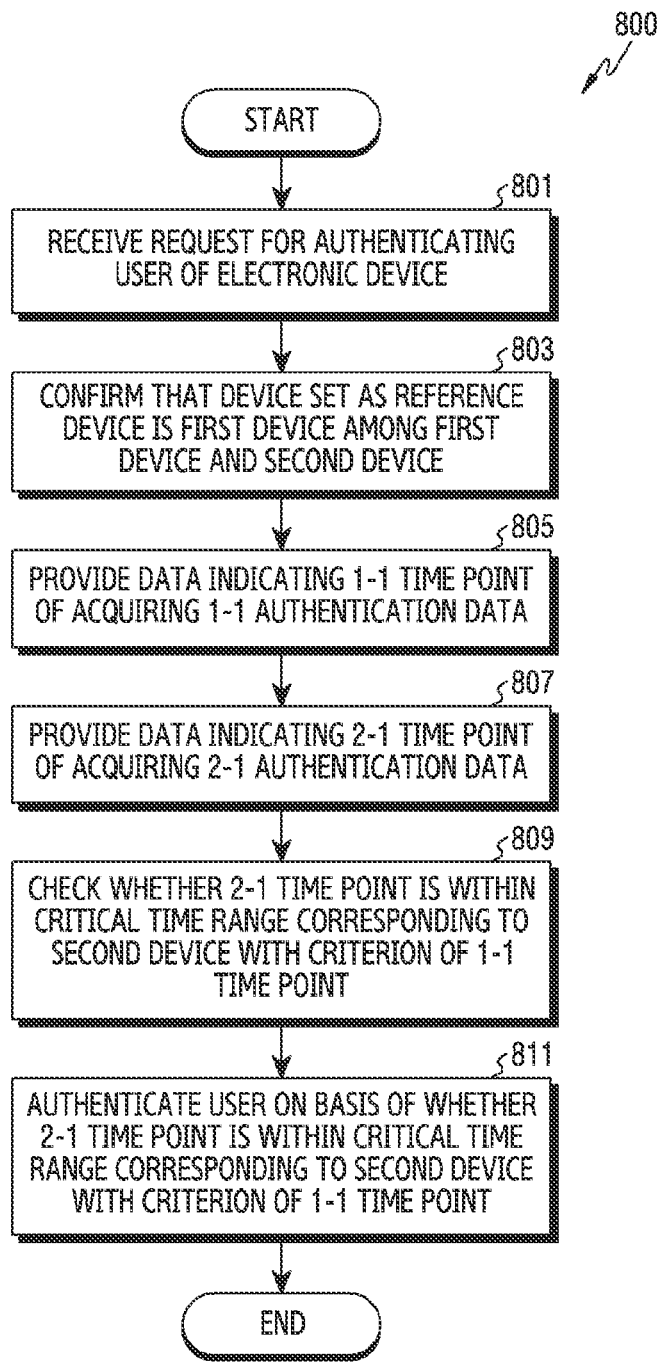
FIG. 8 is a flowchart illustrating an example method for authenticating a user based on a threshold time range which is set according to a function related to authentication execution, according to various embodiments.

FIG. 8 is a flowchart 800 illustrating an example method for authenticating a user based on a threshold time range which is set according to a function related to authentication execution, according to various embodiments.

Referring to FIG. 8, in an embodiment, operation 801, 803, 805 and operation 807 are at least partially the same as or similar with operation 301 to operation 307 of FIG. 3 and thus, a detailed description may not be repeated here.

In operation 809, in an embodiment, the processor 250 can identify whether a second time point is within a threshold time range corresponding to a second device with criterion of a first time point, based on data indicating the first time point and data indicating the second time point.

In an embodiment, in response to the second device (or a comparison device) corresponding to an auxiliary device, the processor 250 can differently set the threshold time range, based on a secure level of a function related to authentication execution.

For example, at the time of performing authentication related to a locking function whose secure level is low compared to a payment function, when the second device (or the comparison device) corresponds to the auxiliary device, the processor 250 can set a wide threshold time range compared to when the second device corresponds to a main device.

For another example, at the time of performing authentication related to the payment function, when the second device corresponds to the auxiliary device, the processor 250 can set the same threshold time range as when the second device corresponds to the main device.

However, an embodiment is not limited to this, and regardless of the secure level of the function related to authentication execution, when the second device (or the comparison device) corresponds to the auxiliary device, the processor 250 can set a wide threshold time range compared to when the second device corresponds to the main device.

In operation 811, in an embodiment, the processor 250 can authenticate a user using the first authentication data and the second authentication data, based on whether the second time point is within a threshold time range corresponding to the second device with criterion of the first time point.

In an embodiment, operation 811 is at least partially the same as or similar with operation 311 of FIG. 3 or at least one of operations of FIG. 5 or FIG. 7 and thus, a detailed description may not be repeated here.

A method according to various example embodiments of the present disclosure can include: receiving a request for authenticating a user of an electronic device using a specified authentication method, and confirming that a device selected as a reference device is a first device among the first device and a second device which are included in at least one sensor and a communication circuit which are capable of providing authentication data required for authenticating the user using the specified authentication method, and in response to first authentication data for authenticating the user being acquired from the first device, providing data indicating a first time point at which the processor has acquired the first authentication data, and in response to second authentication data for authenticating the user being acquired from the second device, providing data indicating a second time point at which the processor has acquired the second authentication data, and identifying whether the second time point is within a threshold time range of the first time point, based on the data indicating the first time point and the data indicating the second time point, and authenticating the user using the first authentication data and the second authentication data, based on whether the second time point is within the threshold time range of the first time point.

In various example embodiments, the method can further include, in response to acquiring at least one authentication data among the first authentication data or the second authentication data in an REE, providing at least one data among the data indicating the first time point or the data indicating the second time point in the REE, and identifying whether the second time point is within the threshold time range of the first time point, based on the at least one data among the data indicating the first time point or the data indicating the second time point in a TEE.

In various example embodiments, authenticating the user using the first authentication data and the second authentication data can include, in response to confirming that the second time point is within the threshold time range of the first time point, authenticating the user using the first authentication data and the second authentication data.

In various example embodiments, authenticating the user using the first authentication data and the second authentication data can further include identifying whether at least one authentication data among the first authentication data or the second authentication data is authentication data which does not include unique information of the user but is required for authenticating the user, and in response to confirming that the at least one authentication data is the authentication data which does not include the unique information of the user but is required for authenticating the user, adjusting a threshold similarity rate which will be compared with a similarity rate between the at least one authentication data and registered authentication data, based on a time difference between the first time point and the second time point.

In various example embodiments, authenticating the user using the first authentication data and the second authentication data can include, in response to confirming that the second time point is not within the threshold time range of the first time point, acquiring third authentication data provided by the first device after the acquiring the first authentication data and provide data indicating a third time point at which the processor has acquired the first authentication data, and acquiring fourth authentication data provided by the second device after the acquiring the second authentication data and providing data indicating a fourth time point at which the processor 250 has acquired the fourth authentication data, and identifying whether the fourth time point is within a threshold time range of the third time point, based on the data indicating the third time point and the data indicating the fourth time point, and authenticating the user using the third authentication data and the fourth authentication data, based on whether the fourth time point is within the threshold time range of the third time point.

In various example embodiments, the method can further include, in response to confirming that the second time point is within the threshold time range of the first time point, confirming a first quality of the first authentication data and a second quality of the second authentication data, and identifying whether at least one of the first quality or the second quality is equal to or is less than a specified quality, and in response to confirming that the at least one of the first quality or the second quality is equal to or is less than the specified quality, providing data indicating that the at least one of the first quality or the second quality is equal to or is less than the specified quality.

In various example embodiments, the method can further include identifying whether the added number of times adding up the number of times of confirming that the second time point is not within the threshold time range of the first time point and the number of times of providing the data indicating that the at least one of the first quality or the second quality is equal to or is less than the specified quality is less than the specified number of times, and in response to the added number of times being less than the specified number of times, providing the data indicating the third time point, providing the data indicating the fourth time point, identifying whether the fourth time point is within the threshold time range of the third time point, and authenticating the user using the third authentication data and the fourth authentication data.

A data structure used in the aforementioned embodiment of the present disclosure can be recorded in a non-transitory computer-readable recording medium through various means. The computer-readable recording medium may include a storage medium such as a magnetic storage medium (for example, a ROM, a floppy disc, a hard disc, etc.) and/or an optical reading medium (for example, a CD-ROM, a DVD, etc.).

In an embodiment, a non-transitory computer-readable recording medium can record a program for executing the operations of in an electronic device 101, receiving a request for authenticating a user of the electronic device using a specified authentication method, and confirming that a device selected as a reference device is a first device among the first device and a second device which are included in at least one sensor and a communication circuit 220 which are capable of providing authentication data required for authenticating the user using the specified authentication method, and in response to first authentication data for authenticating the user being acquired from the first device, providing data indicating a first time point at which the processor 250 has acquired the first authentication data, and in response to second authentication data for authenticating the user being acquired from the second device, providing data indicating a second time point at which the processor 250 has acquired the second authentication data, and identifying whether the second time point is within a threshold time range with criterion of the first time point, based on the data indicating the first time point and the data indicating the second time point, and authenticating the user using the first authentication data and the second authentication data, based on whether the second time point is within the threshold time range with criterion of the first time point.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents.

The invention claimed is:

1. An electronic device comprising:
   at least one sensor;
   a communication circuit;
   one or more processors; and
   memory storing instructions that, when executed by the one or more processors individually and/or collectively, are configured to cause the electronic device to:
   receive a request for authenticating a user of the electronic device using a specified authentication method;
   identify a first device as a reference device among the first device and a second device included in the at least one sensor and the communication circuit, wherein the first device and the second device are to provide authentication data required for authenticating the user using the specified authentication method;
   based on first authentication data for authenticating the user acquired from the first device, generate first data indicating a first time point at which the one or more processor acquires the first authentication data;
   based on second authentication data for authenticating the user acquired from the second device, generate second data indicating a second time point at which the one or more processor acquires the second authentication data;
   identify whether the second time point is within a threshold time range from the first time point, based on the first data indicating the first time point and the second data indicating the second time point;
   authenticate the user by using the first authentication data and the second authentication data, based on the second time point being within the threshold time range from the first time point, and
   identify the first device as the reference device, based on a falsification difficulty of the first authentication data and/or a security degree of the first authentication data, wherein the first authentication data includes unique information of the user.

2. The electronic device of claim 1, wherein the instructions upon being executable by the one or more processors individually and/or collectively, further cause the electronic device to:
   in response to acquiring at least one authentication data among the first authentication data or the second authentication data in a rich execution environment (REE), generate at least one data among the first data indicating the first time point or the second data indicating the second time point in the REE; and
   identify whether the second time point is within the threshold time range of the first time point, based on the at least one data among the first data indicating the first time point or the second data indicating the second time point in a trusted execution environment (TEE).

3. The electronic device of claim 1, wherein the instructions upon being executable by the one or more processors individually and/or collectively, further cause the electronic device to, in response to identifying that the second time point being within the threshold time range of the first time point, authenticate the user using the first authentication data and the second authentication data.

4. The electronic device of claim 3, wherein the instructions upon being executable by the one or more processors individually and/or collectively, further cause the electronic device to:
   identify whether at least one authentication data among the first authentication data or the second authentication data is authentication data not including unique information of the user and is required for authenticating the user; and
   in response to identifying that the at least one authentication data is the authentication data not including the unique information of the user and required for authenticating the user, adjust a threshold similarity rate to be compared with a similarity rate between the at least one authentication data and registered authentication data, based on a time difference between the first time point and the second time point.

5. The electronic device of claim 3, wherein the instructions upon being executable by the one or more processors individually and/or collectively, further cause the electronic device to:
   in response to identifying that the second time point is not within the threshold time range of the first time point,
   acquire third authentication data provided by the first device after the acquiring the first authentication data and generate third data indicating a third time point at which the one or more processor acquires the first authentication data;
   acquire fourth authentication data provided by the second device after the acquiring the second authentication data and generate fourth data indicating a fourth time point at which the one or more processor acquires the fourth authentication data;
   identify whether the fourth time point is within a threshold time range of the third time point, based on the third data indicating the third time point and the fourth data indicating the fourth time point; and
   authenticate the user using the third authentication data and the fourth authentication data, based on whether the fourth time point is within the threshold time range of the third time point.

6. The electronic device of claim 5, wherein the instructions upon being executable by the one or more processors individually and/or collectively, further cause the electronic device to:
   in response to identifying that the second time point is within the threshold time range of the first time point,
   identify a first quality of the first authentication data and a second quality of the second authentication data;
   identify whether at least one of the first quality or the second quality is equal to or is less than a specified quality; and in response to identifying that the at least one of the first quality or the second quality is equal to or is less than the specified quality, generate data indicating that the at least one of the first quality or the second quality is equal to or is less than the specified quality.

7. The electronic device of claim 6, wherein the instructions upon being executable by the one or more processors individually and/or collectively, further cause the electronic device to:
identify whether an added number of times adding up a number of times of identifying that the second time point is not within the threshold time range of the first time point and a number of times of generating the data indicating that the at least one of the first quality or the second quality is equal to or is less than the specified quality is less than a specified number of times; and
in response to the added number of times being less than the specified number of times, perform an operation of generating the third data indicating the third time point, an operation of generating the fourth data indicating the fourth time point, an operation of identifying whether the fourth time point is within the threshold time range of the third time point, and an operation of authenticating the user using the third authentication data and the fourth authentication data.

8. The electronic device of claim 7, wherein the instructions upon being executable by the one or more processors individually and/or collectively, further cause the electronic device to:
in response to the added number of times being equal to or greater than the specified number of times, and the second device being a device providing authentication data not including unique information of the user and required for authenticating the user, authenticate the user, using a third device in place of the second device, the third device being capable of providing authentication data indicating the same feature as a feature required for authentication indicated by the authentication data provided by the second device, and the first device.

9. The electronic device of claim 7, wherein the instructions upon being executable by the one or more processors individually and/or collectively, further cause the electronic device to:
in response to the added number of times being equal to or greater than the specified number of times, and the second device being a device providing authentication data including unique information of the user, determine that the user is not authenticated.

10. The electronic device of claim 1, wherein the instructions upon being executable by the one or more processors individually and/or collectively, further cause the electronic device to:
identify a secure level set to a function related to the specified authentication method, and adjust the threshold time range based on the secure level.

11. The electronic device of claim 1, wherein the instructions upon being executable by the one or more processors individually and/or collectively, further cause the electronic device to:
identify the first device as the reference device, based on a frames per second (FPS) of the first device and second device.

12. The electronic device of claim 1, wherein the instructions upon being executable by the one or more processors individually and/or collectively, further cause the electronic device to:
identify the first device as the reference device, based on situation information.

13. A method of an electronic device, the method comprising:
receiving a request for authenticating a user of an electronic device using a specified authentication method;
identifying a first device as a reference device among the first device and a second device;
based on first authentication data for authenticating the user acquired from the first device, generating first data indicating a first time point at which the electronic device acquires the first authentication data;
based on second authentication data for authenticating the user acquired from the second device, generating second data indicating a second time point at which the electronic device acquires the second authentication data;
identifying whether the second time point is within a threshold time range of the first time point, based on the first data indicating the first time point and the second data indicating the second time point;
authenticating the user using the first authentication data and the second authentication data, based on whether the second time point is within the threshold time range of the first time point, and
identifying the first device as the reference device, based on a falsification difficulty of the first authentication data and/or a security degree of the first authentication data, wherein the first authentication data includes unique information of the user.

14. The method of claim 13, further comprising:
in response to acquiring at least one authentication data among the first authentication data or the second authentication data in a rich execution environment (REE), generating at least one data among the first data indicating the first time point or the second data indicating the second time point in the REE; and
identifying whether the second time point is within the threshold time range of the first time point, based on the at least one data among the first data indicating the first time point or the second data indicating the second time point in a trusted execution environment (TEE).

15. The method of claim 13, wherein authenticating the user using the first authentication data and the second authentication data comprises
in response to identifying that the second time point is within the threshold time range of the first time point, authenticating the user using the first authentication data and the second authentication data.

* * * * *